United States Patent
Bhatia et al.

(10) Patent No.: US 9,740,510 B2
(45) Date of Patent: Aug. 22, 2017

(54) MINIMIZING OVERHEAD OVER-PROVISIONING COSTS IN MACHINE CONFIGURATIONS

(71) Applicant: ALCATEL-LUCENT USA, INC., Murray Hill, NJ (US)

(72) Inventors: Randeep S. Bhatia, Green Brook, NJ (US); Bhawna Gupta, Basking Ridge, NJ (US); Elisha Rosensweig, Ra'anana (IL)

(73) Assignees: Alcatel Lucent, Boulogne-Billancourt (FR); Alcatel-Lucent USA Inc., Murray Hill, NJ (US)

( * ) Notice: Subject to any disclaimer, the term of this patent is extended or adjusted under 35 U.S.C. 154(b) by 188 days.

(21) Appl. No.: 14/674,902

(22) Filed: Mar. 31, 2015

(65) Prior Publication Data

US 2016/0291990 A1    Oct. 6, 2016

(51) Int. Cl.
*G06F 15/16* (2006.01)
*G06F 9/445* (2006.01)
(Continued)

(52) U.S. Cl.
CPC ...... *G06F 9/44505* (2013.01); *G06F 9/45558* (2013.01); *G06F 9/5011* (2013.01); *G06F 2009/45562* (2013.01)

(58) Field of Classification Search
CPC .............. G06F 9/44505; G06F 9/5011; G06F 9/45558; G06F 9/45562
(Continued)

(56) References Cited

U.S. PATENT DOCUMENTS 7,451,221 B2 * 11/2008 Basani ............... H04L 67/1095
                                                  709/208
8,095,662 B1 *  1/2012 Lappas .................. G06Q 10/06
                                                  709/226
(Continued)

OTHER PUBLICATIONS

Andres, "Towards Autonomic Workload Provisioning for Enterprise Grids and Clouds", IEEE/ACM International Conference on Grid Computing, 2009, 50-57.

*Primary Examiner* — Michael Y Won
(74) *Attorney, Agent, or Firm* — Kramer & Amado, P.C.

(57) ABSTRACT

A method and apparatus for substantially minimizing overhead over-provisioning costs in machine configurations is disclosed. The method involves the steps of: clustering a plurality of given machine configurations into a quantity of clusters less than or equal to a pre-specified amount; determining a respective dominant provisioning machine configuration for each cluster of the quantity of clusters; and determining an overall over-provisioning resource cost associated with the respective quantity of clusters and associated respective dominant provisioning machine configurations; and assigning to a mapping function the respective associated dominant provisioning machine configuration of each respective cluster of the quantity of clusters as the target for the given machine configurations of each respective cluster of the quantity of clusters. The method for substantially minimizing overhead over-provisioning costs in machine configurations provides advantages over systems known in the art by allowing minimization of average overhead due to over-provisioning costs as well as minimizing the maximum overhead due to over-provisioning costs.

28 Claims, 8 Drawing Sheets

(51) Int. Cl.
  *G06F 9/50*   (2006.01)
  *G06F 9/455*  (2006.01)

(58) Field of Classification Search
  USPC .......................................................... 709/226
  See application file for complete search history.

(56) References Cited

U.S. PATENT DOCUMENTS

| | | | | |
|---|---|---|---|---|
| 8,352,608 | B1* | 1/2013 | Keagy | G06F 8/63 709/220 |
| 8,478,878 | B2 | 7/2013 | Freimuth et al. | |
| 8,874,705 | B1* | 10/2014 | Satish | G06F 11/008 709/220 |
| 2004/0174829 | A1* | 9/2004 | Ayyagari | H04L 45/04 370/254 |
| 2005/0174950 | A1* | 8/2005 | Ayyagari | H04L 41/30 370/254 |
| 2006/0224359 | A1* | 10/2006 | Ashcraft | G06F 8/71 702/182 |
| 2007/0250608 | A1* | 10/2007 | Watt | G06F 9/4401 709/222 |
| 2008/0186873 | A1* | 8/2008 | Pujet | H04L 41/0826 370/254 |
| 2009/0150717 | A1* | 6/2009 | Lee | G06F 11/008 714/4.1 |
| 2013/0138812 | A1 | 5/2013 | Assuncao et al. | |
| 2013/0139152 | A1 | 5/2013 | Chang | |
| 2013/0185729 | A1 | 7/2013 | Vasic et al. | |
| 2013/0227558 | A1* | 8/2013 | Du | G06F 9/45558 718/1 |
| 2014/0047342 | A1* | 2/2014 | Breternitz | G06F 9/5061 715/735 |
| 2014/0301245 | A1* | 10/2014 | Rose | H04L 41/0823 370/255 |
| 2016/0043970 | A1* | 2/2016 | Jacob | H04L 67/1002 709/226 |
| 2016/0269313 | A1* | 9/2016 | Brooker | G06F 9/5072 |

* cited by examiner

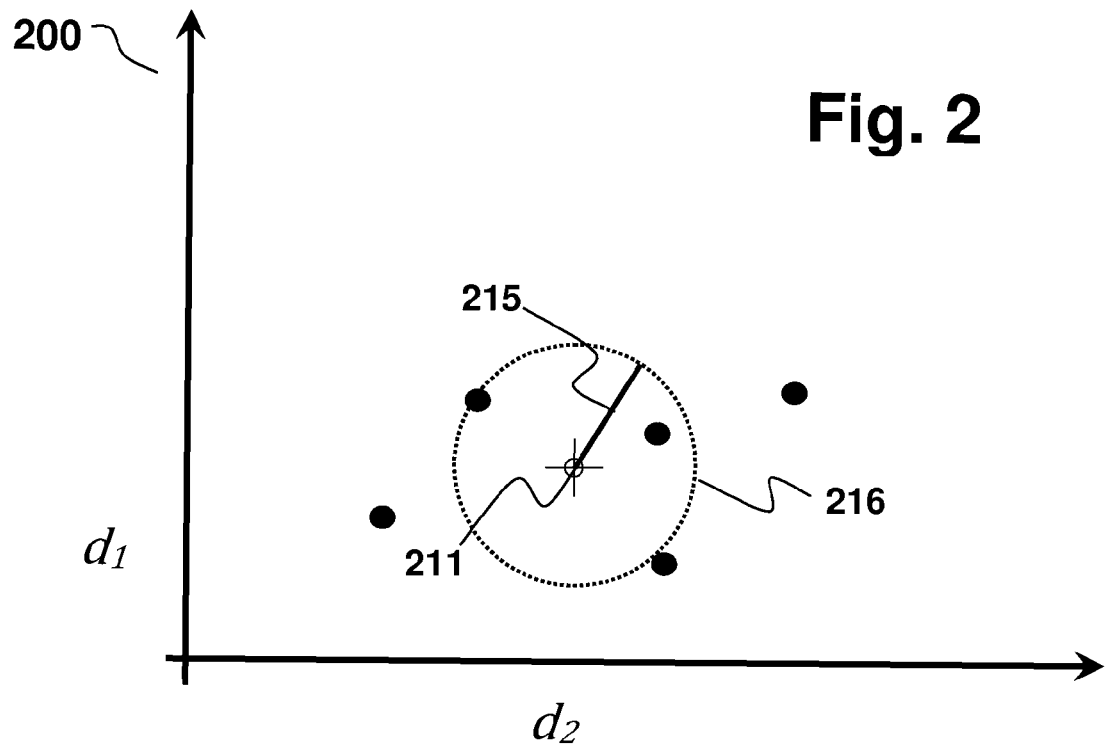
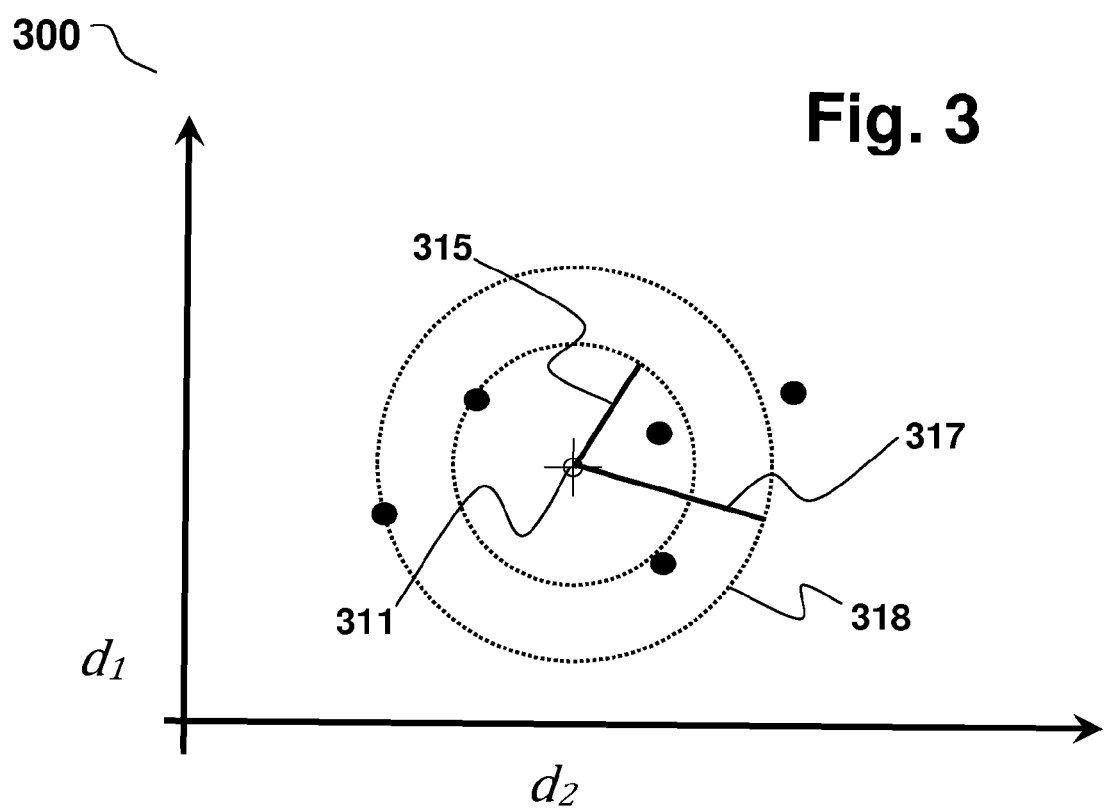

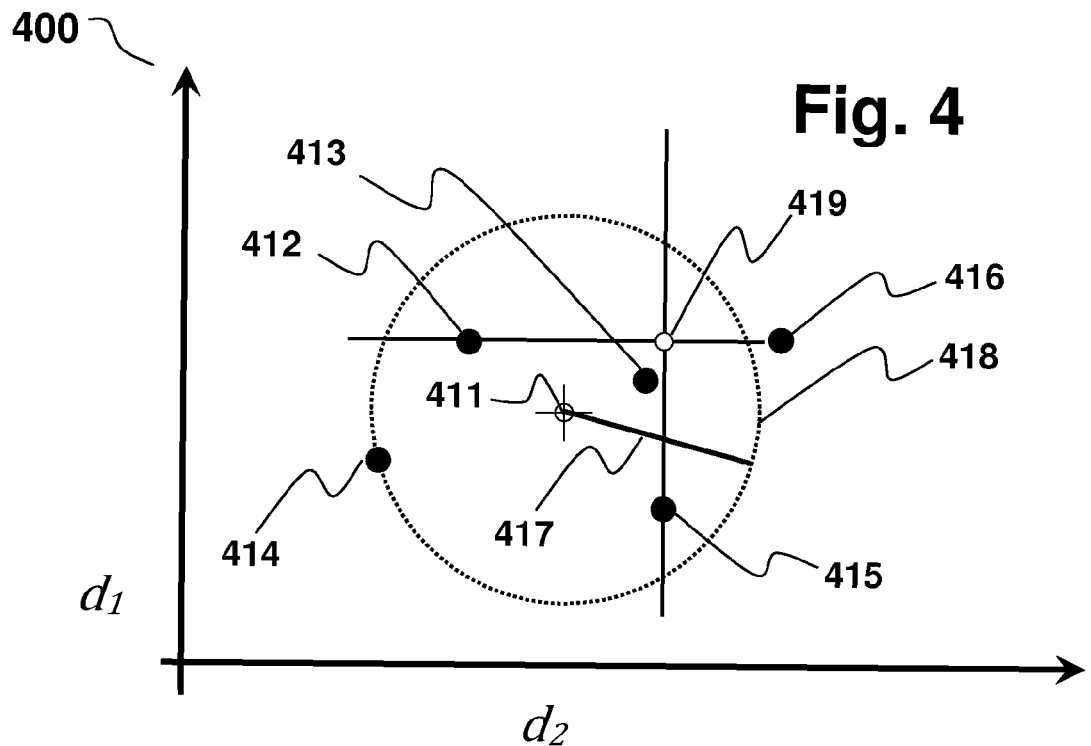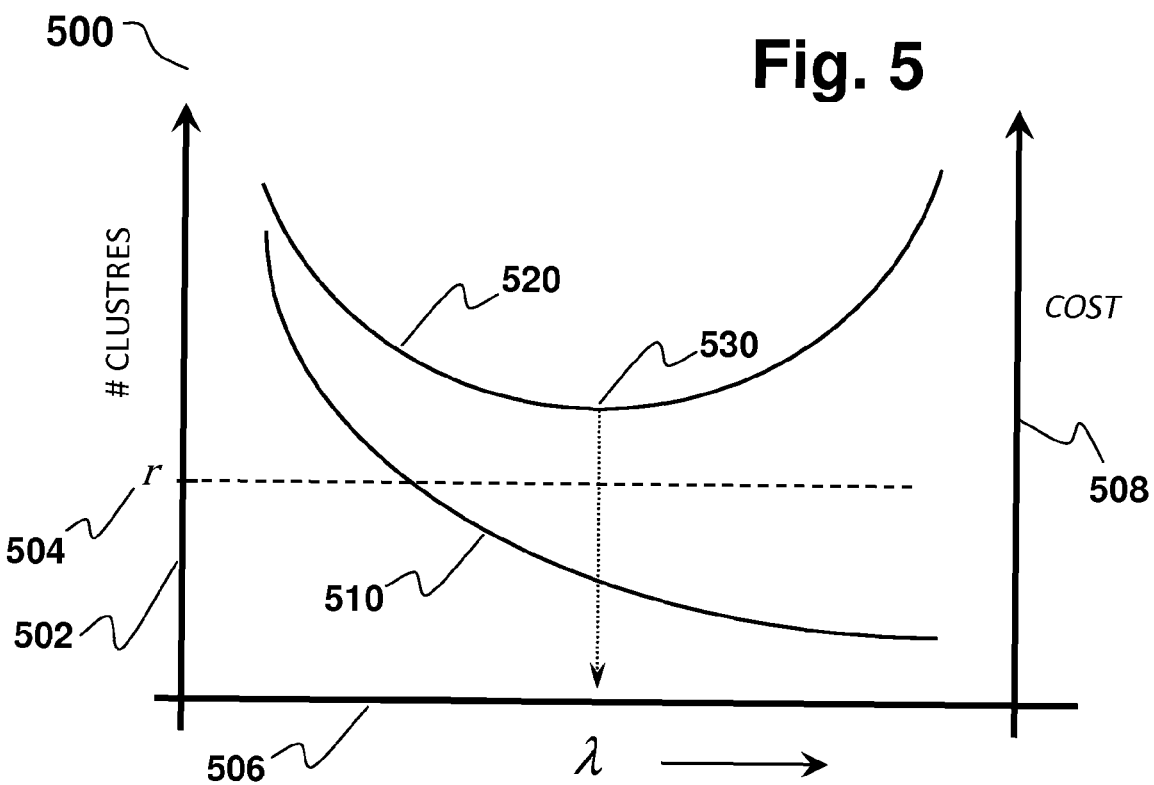

MINIMIZING OVERHEAD OVER-PROVISIONING COSTS IN MACHINE CONFIGURATIONS

FIELD OF THE INVENTION

Embodiments of the present invention relate to provisioning of Virtual Machines (VMs) for cloud services and are particularly concerned with methods of optimizing the set of pre-provisioned configurations of VMs.

BACKGROUND OF THE INVENTION

Cloud computing with its flexible pricing model and elasticity has gained immense popularity in recent years. The cloud's pay-as-you-use model makes it easy for clients to incrementally pay for resources as opposed to making large upfront investments as may be needed to handle future workloads. Moreover the elastic nature of cloud service providing enables users to acquire and release resources as the demand changes. By provisioning just the right amount of resources service providers avoid both the cost in-efficiency of over-provisioning as well as the adverse impact on application SLAB (Service Level Agreements) due to under-provisioning. Workload surges are handled by deploying additional resources (e.g. spinning up Virtual Machines) and high utilization is maintained by de-provisioning unnecessary resources (e.g. spinning down Virtual Machines).

Clouds strive for automatic scaling of application resources in the face of changing demands. Ideally this is only possible when resources can be instantaneously provisioned and deployed as needed. All the needed Virtual Machines (VMs) have to be in a ready state at the time of the demand surge for otherwise the applications may experience a period of poor performance awaiting the provisioning of additional VMs. However this can be challenging since on-demand provisioning of VMs is inherently a slow process taking anywhere from many seconds to order of minutes.

VM provisioning delay may include the time
a) for the scheduler to find the right physical machine to host the VM;
b) to transfer the Virtual Machine Image (VMI) from a storage node to a compute node over the network;
c) to decompress the VMI at the compute node (compression of VMI done to save on storage costs);
d) for resource allocation and configuration of the VM (e.g. network provisioning);
d) for booting up the VM by reading data from the VMI (OS dependent boot time, including time to start all services).

VM provisioning time may be reduced by optimizing any or all of these steps.

Many Cloud Providers (e.g. AWS) support the option to create VMs from templates. A template is a pre-configured reusable VM image that includes virtual hardware components (virtual CPU (vCPU), virtual Network Interface Card (vNIC), etc.), an installed guest operating system (OS) and software application(s).

Booting up from a template can be much faster since it avoids the costly steps of configuring the VM, installing its OS and applications. Furthermore if the template is already in the memory of the host machine then the delays to access and possibly transfer the underlying image data from the disk, and over the network, are also eliminated.

However a challenge is that once a VM is booted up from a template it cannot be used for other VMs. This can be avoided by making a copy of the template just before using it for booting a VM. However this can introduce additional delays during VM provisioning.

An alternative is to keep multiple cloned disk or memory copies of templates. However, since the templates are large image files this may only be cost effective if the number of cloned copies is kept within a manageable number.

Most techniques for speeding up on-demand provisioning of VMs make use of pre-provisioned VMs or their images. This can require dedicating resources (e.g. disk or memory) for storing VM images, and (compute, memory and power resources) for maintaining running VMs. The cost for this can become prohibitive if all VMs or VM images are kept for all possible current and future resource configuration needs for each individual application hosted in the cloud.

It therefore becomes necessary to optimize the set of pre-provisioned configurations of VMs or their images needed to satisfy the rapid auto-scaling requirements of cloud applications. This set must hold, at any time, for any application, the right set of pre-provisioned configurations of VMs or their images using which the applications demand surge can be quickly met with little or no over or under provisioning.

Many pre-provisioned configurations can be reused across multiple applications as there can be many applications whose resource needs, although not exactly the same, may be close enough to be satisfied by the same VM configuration. Thus, possibly only a few different VM configurations may be sufficient to satisfy the cloud applications collective auto-scaling needs, although doing so will likely incur some quantity of over-provisioning overhead.

Therefore, it would be useful to have a method which could facilitate solution of the problem of speeding up on-demand VM provisioning for auto-scaling in the cloud.

SUMMARY OF THE INVENTION

It is an object of the invention to provide a method which could facilitate solution of the problem of on-demand VM provisioning for auto-scaling in the cloud.

According to a first aspect of the invention there is disclosed a method of identifying a set of pre-provisioned machine configurations and an associated mapping function for mapping each of a plurality of given machine configurations to the set of pre-provisioned machine configurations so as to produce a resource cost for the set of pre-provisioned machine configurations, the method having the steps of: clustering said plurality of given machine configurations into a quantity of clusters less than or equal to a pre-specified amount; determining a respective dominant provisioning machine configuration for each cluster of said quantity of clusters; and determining an overall over-provisioning resource cost associated with the respective quantity of clusters and associated respective dominant provisioning machine configurations; and assigning to the mapping function the respective associated dominant provisioning machine configuration of each respective cluster of the quantity of clusters as the target for the given machine configurations of each respective cluster of the quantity of clusters.

In some of these embodiments the resource cost is selected from the group consisting of an average cost, a maximum cost, and a maximum cost quantified using ratio points. Some of these embodiments further have the steps of: varying the quantity of clusters to determine a quantity less than the pre-specified amount for which the overall over-provisioning resource cost is substantially minimized; and using that quantity of clusters for which the overall over-provisioning resource cost is substantially minimized in the assigning step.

In other of these embodiments the set of respective dominant provisioning machine configurations is selected from a pre-provisioned set of provisioned machine configurations. Some of these embodiments further have the steps of: varying the quantity of clusters to determine a quantity less than the pre-specified amount for which the overall over-provisioning resource cost is substantially minimized; and using that quantity of clusters for which the overall over-provisioning resource cost is substantially minimized in the assigning step. Others of these embodiments further have the steps of: associating an operating cost with each of the given set of provisioned machine configurations; and including the operating costs in the determining step. Some of these embodiments further have the steps of varying the quantity of clusters to determine a quantity less than the pre-specified amount for which the overall over-provisioning resource cost is substantially minimized; and using that quantity of clusters for which the overall over-provisioning resource cost is substantially minimized in the assigning step.

Another embodiment of this aspect of the invention further has the steps of varying the quantity of clusters to determine a quantity less than the pre-specified amount for which the overall over-provisioning resource cost is substantially minimized; and using that quantity of clusters for which the overall over-provisioning resource cost is substantially minimized in the assigning step.

According to yet another embodiment of this aspect of the invention the set of respective dominant provisioning machine configurations is selected from a pre-provisioned set of provisioned machine configurations. Some of these embodiments further have the steps of: varying the quantity of clusters to determine a quantity less than the pre-specified amount for which the overall over-provisioning resource cost is substantially minimized; and using that quantity of clusters for which the overall over-provisioning resource cost is substantially minimized in the assigning step.

Others of these embodiments of the invention further have the steps of associating an operating cost with each of the given set of provisioned machine configurations; and including the operating costs in the determining step. Some of these embodiments further have the steps of varying the quantity of clusters to determine a quantity less than the pre-specified amount for which the overall over-provisioning resource cost is substantially minimized; and using that quantity of clusters for which the overall over-provisioning resource cost is substantially minimized in the assigning step.

According to a second aspect of the invention there is disclosed apparatus for identifying a set of pre-provisioned machine configurations and an associated mapping function for mapping each of a plurality of given machine configurations to the set of pre-provisioned machine configurations so as to produce a resource cost for the set of pre-provisioned machine configurations, the apparatus having a data storage; and a processor communicatively connected to the data storage, the processor being configured to: cluster the plurality of given machine configurations into a quantity of clusters less than or equal to a pre-specified amount; determine a respective dominant provisioning machine configuration for each cluster of the quantity of clusters; and determine an overall over-provisioning resource cost quantified using point ratios associated with the respective quantity of clusters and associated respective dominant provisioning machine configurations; and assign to the mapping function the respective associated dominant provisioning machine configuration of each respective cluster of the quantity of clusters as the target for the given machine configurations of each respective cluster of the quantity of clusters.

In some embodiments of this aspect of the invention the resource cost is selected from the group consisting of an average cost, a maximum cost, and a maximum cost quantified using ratio points. Some of these embodiments have the processor further configured to vary the quantity of clusters to determine a quantity less than the pre-specified amount for which the overall over-provisioning resource cost is substantially minimized; and use that quantity of clusters for which the overall over-provisioning resource cost is substantially minimized in the assigning step.

Other embodiments of this aspect of the invention have the set of respective dominant provisioning machine configurations selected from a pre-provisioned set of provisioned machine configurations. In some of these embodiments the processor is further configured to vary the quantity of clusters to determine a quantity less than the pre-specified amount for which the overall over-provisioning resource cost is substantially minimized; and use that quantity of clusters for which the overall over-provisioning resource cost is substantially minimized in the assigning step.

Other of these embodiments have the processor further configured to associate an operating cost with each of the given set of provisioned machine configurations; and include the operating costs in the determining step. Some of these embodiments have the processor further configured to vary the quantity of clusters to determine a quantity less than the pre-specified amount for which the overall over-provisioning resource cost is substantially minimized; and use that quantity of clusters for which the overall over-provisioning resource cost is substantially minimized in the assigning step.

Another embodiment of this aspect of the invention has the processor further configured to vary the quantity of clusters to determine a quantity less than the pre-specified amount for which the overall over-provisioning resource cost is substantially minimized; and use that quantity of clusters for which the overall over-provisioning resource cost is substantially minimized in the assigning step.

According to yet another embodiment of this aspect of the invention the set of respective dominant provisioning machine configurations is selected from a pre-provisioned set of provisioned machine configurations. Some of these embodiments have the processor further configured to vary the quantity of clusters to determine a quantity less than the pre-specified amount for which the overall over-provisioning resource cost is substantially minimized; and use that quantity of clusters for which the overall over-provisioning resource cost is substantially minimized in the assigning step.

Others of these embodiments of the invention further have the processor further configured to associate an operating cost with each of the given set of provisioned machine configurations; and include the operating costs in the determining step. In some of these embodiments the processor is further configured to vary the quantity of clusters to determine a quantity less than the pre-specified amount for which the overall over-provisioning resource cost is substantially minimized; and use that quantity of clusters for which the overall over-provisioning resource cost is substantially minimized in the assigning step.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which like reference numbers are used to represent like elements, and:

FIG. 2 illustrates an exemplary cluster having a centroid and average cluster distance from said centroid;

FIG. 3 is another illustration of the exemplary cluster of FIG. 2 having an additional distance indicated from said centroid;

FIG. 4 is another illustration of the exemplary cluster of FIG. 3 having an dominant point indicated;

FIG. 5 is dual plot figuratively illustrating the tradeoffs between a cost, a number of clusters and an approximation factor;

DETAILED DESCRIPTION

Figure 1A:
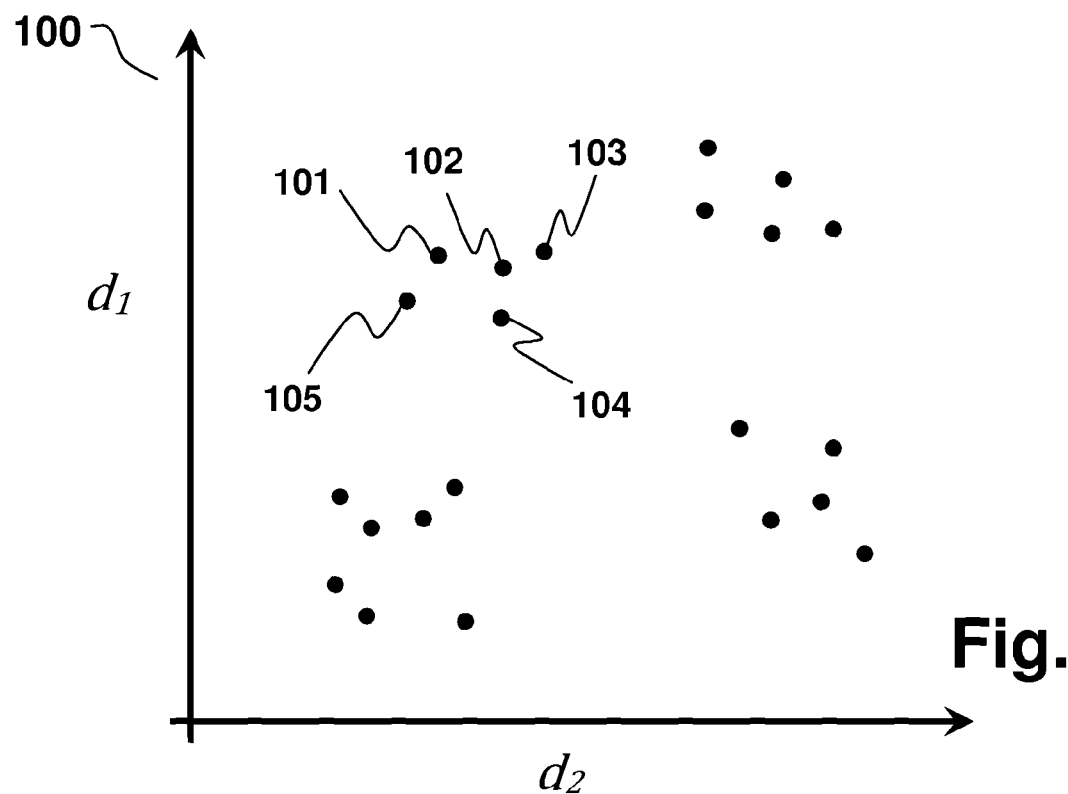
FIG. 1A illustrates an exemplary plot of VM configurations across two-dimensions of resources.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such a feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

The techniques shown in the figures can be implemented using code and data stored and executed on one or more electronic devices (e.g., a network element). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signalssuch as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Customer computer end stations (e.g., workstations, laptops, palm tops, mobile phones, etc.) access content/services provided over the Internet and/or content/services provided on associated networks such as the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, customer computing end stations are coupled (e.g., through customer premise equipment coupled to an access network, wirelessly to an access network) to edge network elements, which are coupled through core network elements of the Internet to the server computing end stations.

In general in the description of the figures, like reference numbers are used to represent like elements.

In this disclosure, references to "we" in connection with steps, apparatus or the like, such as "we do" or "we use" can be interpreted as referring to the named inventors but can also can be interpreted as referring to hardware, software, etc., or combinations in various devices, platforms or systems that perform the steps and/or embody the apparatus, as should be apparent to one of ordinary skill in the art upon reading this disclosure.

We define the Auto-Scaling VM Offering or ASVO problem as: the problem of finding the least cost pre-provisioned configurations of VMs or their images (resource offerings) which can meet all the future or current need of the cloud applications without overtaxing the cloud resources due to resources being dedicated to maintain such configurations and also because of resource wastage due to allocation of more resources than needed for satisfying the applications requirements.

The problem can be challenging since there are various system and service configuration choices that must be made when pre-configuring a VM or its image. These can include:
  system parameters such as the number of vCPUs,
  the virtual disk size,
  the number of vNICs,
  the total amount of memory,
  the guest OS etc. and
  also the type of provisioned services such as
    databases,
    webservers etc.

In addition given the flexibility in the choice of VM configurations that can potentially satisfy an applications need (any VM configured with at least the resources needed by the application) finding the set of VM configurations that can simultaneously satisfy many different applications but without too much over-provisioning can be challenging.

For the ASVO problem we use the past resource usage data of application VMs to infer the number of VMs of a given type (configuration) that would be needed by it in the near future.

We assume the commonly used horizontal scaling approach to handle load variability, whereby the number of VMs allocated to the application are adjusted to match its needs. We make use of the past usage data to also infer the overall growth trend for each VM type. Thus, once the different VM types are identified then the number of VMs of each type selected for pre-configuration can be selected in proportion to their expected growth pattern.

Thus the ASVO problem reduces to that of identifying just the best VM types.

In other words the ASVO problem reduces to the problem of finding the optimal set of distinct VM configurations such that by pre-provisioning enough VMs (or their images) for each of these configurations (relative proportions determined based on usage data), the current and future resource needs of all the applications can be satisfied insofar as predicted by the usage data.

Furthermore, the required solution to the ASVO problem may be constrained by either:
  the allowed number of distinct VM configurations or
  the maximum allowed over-provisioning overhead or
  a combination of the two.

Although, we rely on the applications VM usage data, the acquisition, management and processing (e.g. for identifying trends) of such data as well as any extrapolation to estimate the number and type of VMs that would be needed by an application over a future time period for which the method is run is determined by standard machine learning techniques known to those skilled in the art. We therefore assume that we start with a given dataset that has already undergone such processing. The input dataset therefore is a given collection of data points each of which gives the expected resource usage of an applications VM within the period of interest.

The ASVO problem can be viewed as a clustering of the input dataset representing VM usage. The clustering is defined for points that are "close" enough in terms of the resource requirements of the underlying VMs. Intuitively all data points that fall within a cluster would represent VM configurations that are close enough that only one VM configuration can be sufficient for all of them and doing so would not incur a very high over-provisioning overhead. In some cases the cost of VM configurations is also considered and minimized. The total over-provisioning overhead within a cluster represents its "cluster cost" and it is desired to keep it as small as possible. Also the number of clusters represents the number of distinct VM configurations in the final solution and in certain embodiments this may need to be bounded as well. Rather than the cluster center it is the "dominant cluster corner" which guides the clustering decision thus requiring a novel solution for the ASVO problem.

Problem Definition

Let there be d resources (or services) that can be preconfigured on a VM. These may include resources such as CPU, Disk, NIC, RAM etc. and services such as MySQL database, Apache WebServer etc. A VM configuration can therefore be defined by a d-dimensional point whose i-th component represents the number of instances of the i-th resource that are configured for the VM. For instance for a CPU resource this may represent the number of vCPUs configured for the VM. For a service resource such as MySQL database or a Linux OS this may be a binary value depending on whether the corresponding service is configured or not. Let U be the given dataset of expected VM usage for a given time period for the cloud applications. U is represented as a collection of VM configurations. Thus $u \in U$ is a d-dimensional point whose i-th component $u_i$ gives the expected usage requirement for the i-th resource during the particular time period by an application's VM.

The auto scaling VM offering or the ASVO problem is to compute a pair $(V; f)$. Here V is a set of distinct VM configurations whose instances (or images) are kept in the pre-provisioned pool. $f$ is a function used for selecting VMs from this pre-provisioned pool to satisfy particular resource requirements. Specifically, V is a set of d-dimensional points of distinct VM configurations, and $f$ is a function for mapping any d-dimensional resource usage point u to a VM configuration $l(u) \in V$ In particular $f$ maps each point u in U to a resource offering point $f(u) \in V$. An application that requires VMs with resource requirement $u \in U$ to handle a demand surge is assigned the VMs of configuration $f(u) \in V$ from this pre-provisioned pool. Note that the function $f$ must satisfy $f(u) \geq V$, for all u, i.e. the inequality holds on each of the d-dimensions. That is for a resource requirement to be satisfied, the resource configuration of the VM assigned to it must dominate on each and every resource.

The ASVO can be thought as the problem of clustering the points in U. There is one cluster for every element $o \in V$. All points $u \in U$ for which $f(u) \in o$ are clustered together. Also o can be thought as a dominant center for this cluster since we must have $o = f(u) \geq V$ for all points u in this cluster.

Assigning VMs with resource configuration $f(u)$ when the resource requirement is for VMs with configuration u can result in resource over-provisioning. The goal of the ASVO problem is to select the pair (V; $f$) for which this overhead due to over-provisioning (OOP) cost is minimal. The OOP cost measures how far apart the points $f(u)$ are from the points u. There are various ways of measuring this cost. We present three possible measures.

The first cost measure we consider is the average over-provisioning overhead (AOOP) for the point pairs ($f(u)$;u). The goal here is to minimize the sum of the squares of the distances of the points in U to the closest points in V:

$$\sum_{u \in U} \|f(u) - u\|_2^2$$

Here the term $\|z\|_2$ refers to the $l_2$ or the distance norm of the point z. The average overhead due to over-provisioning is then obtained by dividing this sum by |U| and hence minimizing this sum is equivalent to minimizing the AOOP cost. The AOOP cost also captures the expected over-provisioning overhead for auto-scaling when the pre-provisioned VM configurations are from the set V and the VM resource usage need is distributed according to the probability distribution implied by U.

Alternatively, the OOP cost can be defined with the goal of minimizing the maximum overhead due to over-provisioning (MOOP) cost:

$$\max_{u \in U} \|f(u) - u\|_z$$

Here the goal can be to minimize the maximum combined overhead for all resources. In this case z=2 (for $l_2$ norm).

Alternatively the goal could be to minimize the maximum overhead across all resources. In this case z=∞. Formally, the term $\|z\|_\infty$, or the infinity norm of a point z is the size of its largest coordinate: $\|z\|_\infty = \max_i |z|_i$.

According to yet another embodiment, the overhead due to over-provisioning may be based on the worst case ratio of the points rather than their difference. Thus, the goal may be to minimize the maximum due to over-provisioning quantified using point ratios (MOOPR) cost defined as:

$$\max_{u \in U} \|f(u)/u\|_\infty$$

Here the ratio point z=x/y is defined by $z_i = x_i/y_i$, $\forall_i$.

In the above definitions the assumption is that every resource contributes equally to the over-provisioning cost. However, this does not have to be the case. During a preprocessing the usage points can be normalized individually along each dimension to appropriately weigh the contribution of the respective resource to the overall cost.

The other factor that impacts the over-provisioning overhead is the size of the set V. The size of V relates to the resources needed to maintain the pool of pre-provisioned VMs (or their images). Let W be the maximum number of additional VMs needed at any given time to handle the demand surges of all cloud applications. Then since in the worst case all W VMs may have resource requirements that are best satisfied by a single VM configuration in the pre-provisioned pool, there would need to be W VMs per VM configuration in V Thus, the required pre-provisioned pool size, and hence the resources needed to maintain the pool, can grow linearly with the size of V. Secondly, for larger V, as the application requirements change, there can be greater likelihood of mismatch in the configuration of the VMs allocated to the application and the ones available in the pre-provisioned pool that can best satisfy the applications need, thus triggering frequent reconfiguration.

Thus V must also be kept small to avoid the cost of frequent resource re-configurations due to auto-scaling. On the other hand making V bigger has the opposite effect of lowering the overhead, due to resource over-provisioning, as many more possible choices of VM configurations become available in the pre-provisioned pool. In the description that follows, different embodiments are recited that bound the size of V in various ways.

The cloud provider could specify a pre-provisioned pool resource budget r to restrict the size of V by |V|≤r. Or they could specify a budget p for the overhead due to over-provisioning and let AVSO find the V of minimum size for which this budget is met. Finally, the goal could also be to minimize a cost function that depends on both the over-provisioning overhead along with the size V.

The Budgeted AOOP Embodiment

Here the goal is to compute the solution (V;$f$) for which the sum $$\sum_{u \in U} \|f(u) - u\|_2^2$$

which is directly proportional to the average over-provisioning overhead cost (AOOP cost), is minimized. In addition, we want the size |V| i.e. the cardinality of V to be at most bounded by a VM configuration budget r.

We now provide an overview of the method. The set U can be thought as a collection of points in a d-dimensional space. We use k-means clustering to group the points of U into at most k≤r clusters. In k-means clustering points get mapped to clusters based on their distance to the cluster centers. Let $\{C_1, C_2, \ldots, C_k\}$ be the clusters found by the k-means method with cluster centers $\{c_1, c_2, \ldots, c_k\}$ respectively. Thus, $C_i$ contains those points of U whose closest center is $c_i$ (ties broken arbitrarily) with every point of U assigned to a unique cluster. Thus, k-means clustering implicitly implies a function $f^C:U \rightarrow \{c_1, c_2, \ldots, c_k\}$ that maps points in U to the cluster centers in order to minimize the within-cluster sum of square cost given by:

$$\sum_{u \in U} \|f^C(u) - u\|_2^2$$

Thus, the set $\{c_1, c_2, \ldots, c_k\}$ could have been a good candidate for the set of VM configurations V if the centers $c_i$ also dominated the points of the cluster $C_i$. This is not necessarily the case as in k-means the center $c_i$ is the centroid (or the average) of the points in the cluster $C_i$. In other words, the function $f^C$ does not necessarily satisfy the resource domination condition $f^C(u) \geq u$, $\forall u$ for points in U. The method modifies the cluster centers from $\{c_1, c_2, \ldots, c_k\}$ to new centers $\{c_1', c_2', \ldots, c_k'\}$ which do satisfy the resource domination condition for a large fraction of the points, while also bounding the increase in the within-cluster sum of square cost. The fraction is guided by an approximation factor γ which will limit how far the new centers are from the old centers. The fraction of the points which are not dominated are subjected to another round of k-means clustering and cluster center reassignment. This process is repeated until the resource domination condition is satisfied for all the points. This results in a solution which provides a set of configurations V, and overall over-provisioning overhead cost for the specified approximation factor γ. The approximation factor γ is then varied and the process repeated until a particular approximation factor γ results in a minimum overall over-provisioning overhead cost thus resulting in a feasible solution with bounded performance guarantees.

We now describe the method in more detail. In the beginning of the method V is an empty set of VM configurations, $f^C$ is an empty mapping function, γ is a constant, and all the points in U are marked uncovered. The method works in iterations. In each iteration the method makes progress in clustering some of the uncovered points. The newly clustered points are marked as covered and are not considered for clustering in subsequent iterations. For each newly found cluster C a point c that satisfies $$c \geq u, \forall u \in C$$

is added to the set of VM configurations V. The function $f^C$ is updated to include the mapping $f(c) \geq \forall u \in C$ for points in U. The iterations continue until the set of points of U that are marked uncovered becomes empty. At this point the method outputs the set V and the mapping function $f^C$ for that particular value of γ. The constant γ has a range of potential values, and at some particular value of γ the overall over-provisioning overhead cost is minimized.

Figure 1B:
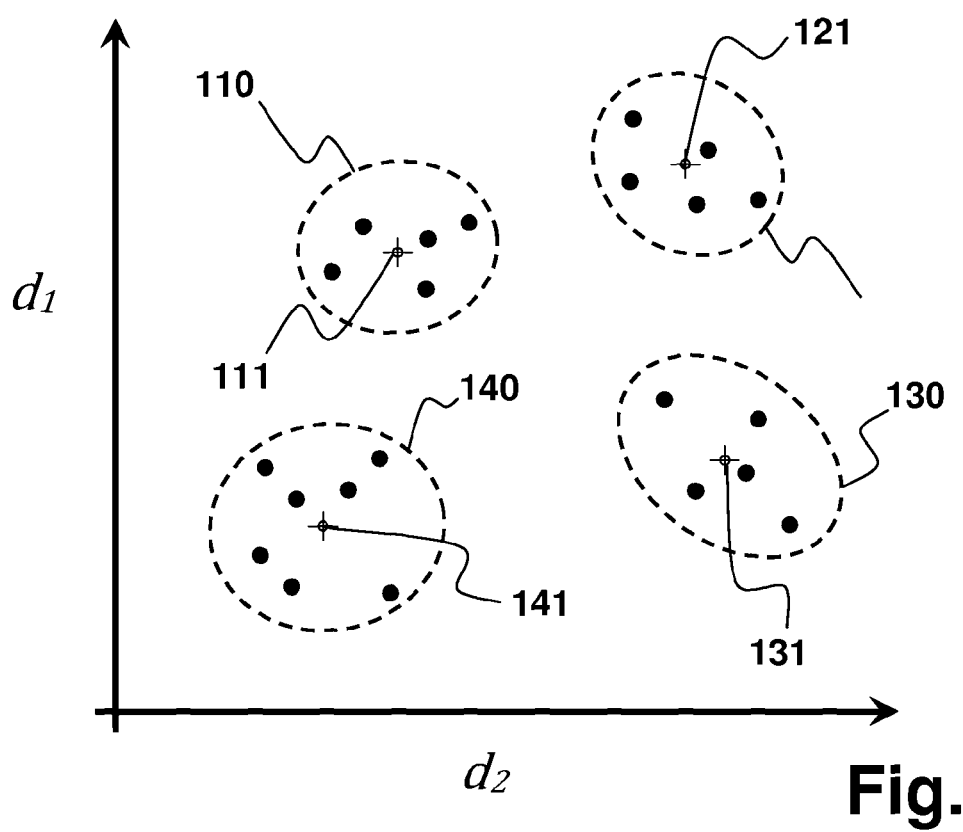
FIG. 1B illustrates the exemplary plot FIG. 1A wherein the VM configurations have been clustered.

The method will now be explained for a two dimensional case. Referring now to FIG. 1A there may be seen a depiction 100 of a two dimensional space having dimensions $d_1$ and $d_2$. Various VM configurations 101, 102, 103, 104, 105, et al. as indicated by the dots are located in this space. In FIG. 1B a clustering function, for example k-means clustering, has been applied which groups the configurations into the four clusters 110, 120, 130, and 140; each having respective cluster centers 111, 121, 131, and 141.

Referring now to FIG. 2 there may be seen an enlarged depiction of the points of cluster 110 which has cluster centroid 211. Distance 215 is a depiction of the average (mean) distance from the centroid 211 for the points of the cluster. In general, where the mean distance from the cluster is not far from the median distance for the set of points, about half of the cluster points may lie inside the circle 216 having a radius of distance 215.

Referring now to FIG. 3 there may again be seen the points of original cluster 110 having centroid 311, radius 315 (the average (mean) distance from the centroid 311 for the points of the cluster) and an additional circle 318 having a radius 317. As may be seen, for radius 317 greater than radius 315 (the average (mean) distance from the centroid 311 for the points of the cluster) there are more points of the cluster within circle 318. In the steps of the method, radius 317 is a function of the approximation factor γ as will be described below.

Referring now to FIG. 4 there may be seen again be seen the points of original cluster 110 having centroid 411, and additional circle 418 having a radius 417 which is a function of approximation factor γ and the average (mean) distance from the centroid 411 for the points of the cluster. There may also be seen point 419 which is said to dominate the points 412, 413, 414, and 415 in the interior of circle 418 as it has dimensions ($d_1$, $d_2$) which are at least as much as the dimensions ($d_x$, $d_y$) of any of the cluster points 412, 413, 414, and 415 within circle 418. In particular point 419 is a particular dominant point in that it is a corner point for those points 412, 413, 414, and 415 within circle 418 as will be described below. Finally, point 416 which is outside circle 418 can be seen as not being dominated by point 419 in that point 416 is larger in the $d_2$ dimension that the $d_2$ dimension of point 419.

This concludes the depiction of relevant relationships in the two dimensional case and may be used as reference as an aid to understanding the multiple dimensional case as will be described in more detail below.

In the description that follows, configuration budget r represents a configuration budget for which the size |V| i.e. the cardinality of V to be at most bounded as described supra.

We now describe the method for a particular iteration.

At the beginning of the iteration let $UP \subseteq U$ be the set of uncovered points. If $|UP| \leq r$ then the method marks all points of UP as covered, adds all these points to the set V, updates $f^C$ to include the mapping $f^C(u)=u, \forall u, \in C$. At this point all the points are covered and the method terminates.

We now describe the case when $|UP|>r$. We use the k-means method to group the points in LIP into at most r clusters. In particular, we run the k-means method for each of the possible k-clustering of the dataset U for k ranging from 1 to r and pick the k for which the k-means cost is the least. Let $C_1, C_2, \ldots, C_k$ be the clustering found by the k-means method with cluster centers $c_1, C_2, \ldots, c_k$ respectively and let the corresponding mapping function be $f^C:U \to \{c_1, c_2, \ldots, c_k\}$. Consider a particular cluster $C_i$ with center $c_i$. We find the average cluster distance $D_i$ from the equation:

$$D_i^2 = \frac{1}{|C_i|} \sum_{u \in C_i} \|c_i - u\|_2^2$$

Let $S_{in}$ denote all the points of $C_i$ that are within distance $D_i$, of $c_i$, for some approximation factor γ>1, and let $S_{out}$ denote the rest of the points in $C_i$. We select $c=c_i+\vec{S}$ as the "tightest" point that dominates all the points in $S_{in}$. Formally, the vector $\vec{S}=(s_1, s_2, \ldots, s_d)$ is selected so that on any dimension i the i-th coordinate of C is at least as much but no more than the i-th coordinate of any point in $S_{in}$. The method marks as covered all the points in $S_{in}$. It adds the point $c=c_i+c(\gamma D_i)$ to V, where $c(\gamma D_i)$ is a function that calculates the vector $\vec{S}$ for a given γ and $D_i$ and updates $f^C$ to include the mapping $f^C(u)=c, \forall u \in S_{in}$. At this point this iteration terminates and the next iteration is started.

With subsequent iterations, more and more points are covered until all the points in UP have been covered. At this point a set V is known for a particular γ and the overall over-provisioning overhead cost may be calculated.

Referring now to FIG. 5 there may be seen a plot figuratively depicting an exemplary relationship between the size |V| and the approximation factor γ. The left axis 502 of plot 500 represents the number of clusters with the configuration budget r as indicated at 504. Horizontal axis 506 shows approximation factor γ. Curve 510 shows the figurative relationship between |V| and γ as decreasing as γ grows in size. As may be understood, with larger γ fewer clusters are required to contain all the points in U. The right axis 508 of plot 500 represents an overall over-provisioning overhead cost. As described supra the cost 520 will rise if |V| grows too high, and as well, the intra-cluster over-provisioning overhead cost will rise if γ grows too large. Point 530 represents the point where the overall over-provisioning overhead cost is a minimum. As γ may be understood to be bounded in that it is >1 and less than some value needed to include all points for the worse sized cluster, point 530 may be found by iterating the above described steps within this range until the minimum is identified.

Figure 6:
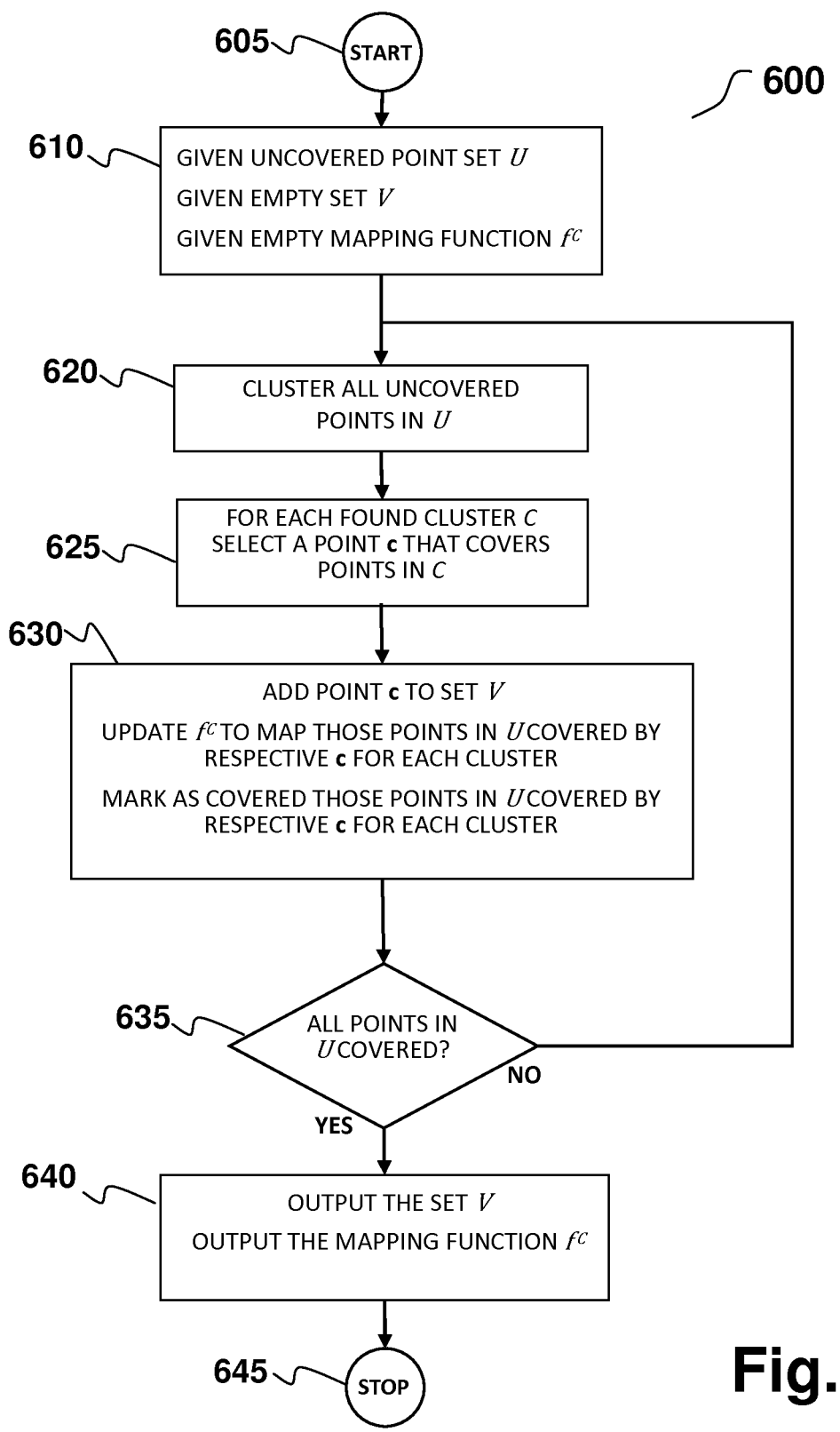
FIG. 6 is flowchart of an embodiment according to an aspect of the disclosed method.

Referring now to FIG. 6 there may be seen a flowchart of an embodiment of the steps of the method. The method commences at step 605. At step 610 an uncovered point set U, an empty set V, and an empty mapping function $f^C$ is provided. At step 620 all the uncovered points in U are clustered. At step 625, for each found cluster C a point c is selected that covers at least some points in C. At step 630 each point c is added to set V, the mapping function $f^C$ is updated to map those points in U covered by a respective c for each cluster, and those points in U covered by a respective c for each cluster are marked as covered.

At step 635 a test is performed to determine if all points in U have been covered. In the event that they have not, control returns to step 620 for another round of clustering. In the event that all points in U have been covered, then control proceeds to step 640 where the set U and the mapping function $f^C$ are output. The method then terminates at step 645.

Figure 7:
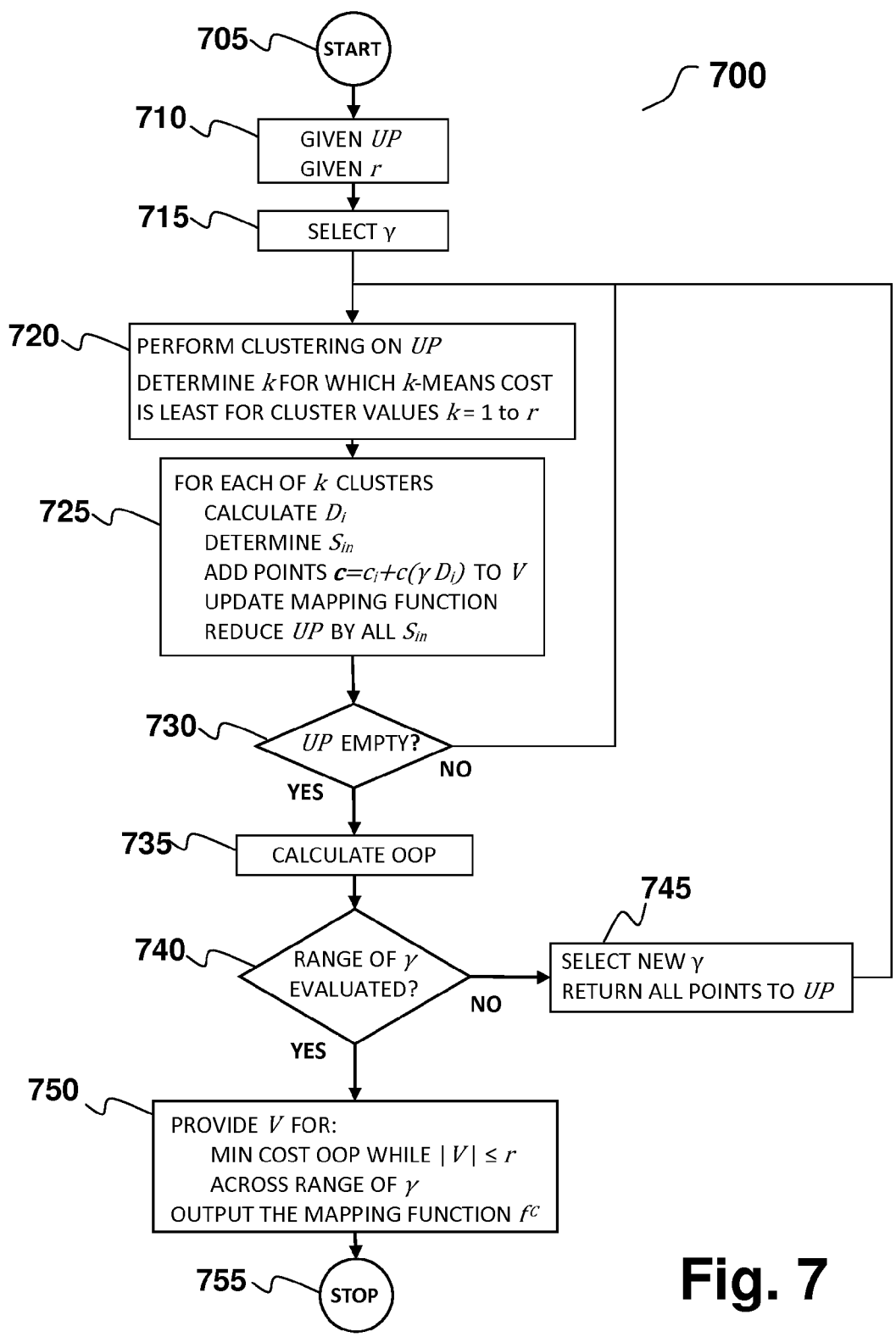
FIG. 7 is flowchart of an embodiment according to another aspect of the disclosed method.

Referring now to FIG. 7 there may be seen a flowchart of another embodiment of the steps of the method. The method commences at step 705. At step 710 an uncovered set of points UP is provided, along with a pre-provisioned pool resource budget r which is the desired upper quantity limit for the resulting set V of configurations. At step 715 a γ is selected. As described supra the value for γ is limited on the one end by the requirement that it be greater than 1. At the upper end of the range there exists a γ for which all points would fall within $S_{in}$ for a given set of clusters. At step 720 the points within UP are clustered for a range of cluster values from 1 to r and the number of clusters k for which an within-cluster overhead cost is minimized is identified.

At step 725 this set of k clusters is processed by for each cluster in the set of k clusters a $D_i$ is calculated; a set $S_{in}$ is determined; a point $c=c_i+c(\gamma D_i)$ added to V, the mapping function $f^C$ is updated so that respective $S_{in}$ points for each cluster are mapped to the respective c for the cluster; and all the points within set $S_{in}$ are removed from UP.

At step 730 there is a test as to whether the set UP is empty. An empty set would imply that all the original points in UP had been processed and the set V is complete in that it covers all the original points in UP. In the event that the set UP is not empty, the process returns to step 720 to perform another iteration of clustering the remaining points in UP, and subsequent steps.

In the event that the set UP is empty, an overall overhead over-provisioning cost is calculated for the set V at step 735.

At step 740 there is a test as to whether the full range of γ has been evaluated. If the answer is negative, at step 745 the process selects a new value for γ, returns all the original points to UP and then returns the process to step 720 for a new round of iterations at the new γ.

In the event that the entire range of γ has been evaluated, at step 750 the method provides the V which provides the minimum overall overhead over-provisioning cost for |V|≤r across the range of γ and outputs the mapping function $f^C$. The process then stops at step 755.

We now show that this method has a good performance.

We say that an method is an (α,β)-approximation if it can find a solution (V,f) in which the configuration cost |V|≤αr and the over-provisioning overhead cost is at most β·OPT.

Here OPT is the over-provisioning overhead (AOOP) cost of the optimal solution (V*,f*) X for points U with |V*|≤r.

Theorem 1: The method is a $$\left(O\left(\frac{\log n}{2\log \gamma}\right), O\left(\frac{1+d\gamma^2}{2\log \gamma}\theta \log n\right)\right)$$

—bi-criterion approximation method for any constant γ>1. Here θ is the approximation ratio of the best k-means method and n=|U|/r is the size of the given problem instance.

Proof

Let OPT denote the within-cluster sum of squares cost (AOOP cost) of the optimal solution (V*,f*). As shown infra in Lemma 3 the within-cluster sum of squares cost of an optimal k-means solution for the point set U is at most OPT. Thus in any iteration the within-cluster sum of squares cost of the clustering found by a θ-approximation k-means method is at most θOPT. Let $C_1, C_2, \ldots, C_k$, be the clusters found by the k-means method with cluster centers $c_1, c_2, \ldots, c_k$ respectively. From $$D_i^2 = \frac{1}{|C_i|}\sum_{u \in C_i}\|c_i - u\|_2^2$$

the within-cluster sub of squares cost $\Sigma_{u \in C_i}\|c_i-u\|_2^2$ for cluster $C_i$, in the k-means solution is $|C_i|D_i^2$. Thus, $\Sigma_{i=1}^{k}|C_i|D_i^2 \leq \theta \text{OPT}$.

In the iteration the method modifies the center of the cluster $C_i$ from $c_i$ to $c=c_i+\vec{S}$. By definition c is a dominant center for all points in $S_{in}$. In addition, the point c is no more than $D_i$ distance away from $c_i$ on any dimension i. This is because by definition any point in $S_{in}$ cannot be more than $\gamma D_i$ away from $c_i$ on any coordinate (because otherwise such a point will be more than $\gamma D_i$ distance away from $c_i$ and hence can't be in $S_{in}$). Thus $|s_m| \leq \gamma D_i$, $\forall m=1, \ldots, d$.

We now show that the total increase in the within-cluster sum of squares cost for these new centers is bounded. From Lemma 2, infra, if follows that for any cluster $C_i$ $$\sum_{u_j \in C_i}\|u_j - c\|_2^2 = \sum_{u_j \in C_i}\|u_j - c_i\|_2^2 + |C_i|\|c - c_i\|_2^2$$

Note that $$\|c - c_i\|_2^2 = \|\vec{S}\|_2^2 = \sum_{m=1}^{d}|s_m|^2 \leq d\gamma^2 D_i^2$$

Thus $$\sum_{u_j \in C_i}\|u_j - c\|_2^2 \leq \sum_{u_j \in C_i}\|u_j - c_i\|_2^2 + d\gamma^2|C_i|D_i^2$$

Adding these for all clusters $C_i$ we get:

$$\sum_{i=1}^{k}\sum_{u_j \in C_i}\|u_j - c\|_2^2 \leq \sum_{i=1}^{k}\sum_{u_j \in C_i}\|u_j - c_i\|_2^2 + d\gamma^2\sum_{i=1}^{k}|C_i|D_i^2$$

The term on the left side of the inequality is the within-cluster sum of squares cost for the new centers. The first term on the right hand side is the within-cluster sum of squares cost of the k-means solution which is at most $\theta OPT$. As established earlier $\Sigma_{i=1}^{k}|C_i|D_i^2 \leq \theta OPT$. Thus the second term on the right side is at most $d\gamma^2\theta OPT$. Thus, the within-cluster sum of squares cost for the new centers is at most $(1+d\gamma^2)\theta OPT$.

The above result holds for every iteration. In each iteration only a subset $S_{in}$ of the remaining uncovered points from each cluster are marked covered. Only for these points the within-cluster sum of squares cost with respect to the new cluster centers is added on to the cost of the final solution. Thus, in each iteration the increase in the within-cluster sum of squares cost is at most $(1+d\gamma^2)\theta OPT$. In other words, the AOOP cost increase per iteration is at most $(1+d\gamma^2)\theta OPT$. We now bound the number of iterations to bound the overall AOOP cost.

First we bound the size of $S_{out}$ of a particular cluster $C_i$ during an iteration. In the k-means solution, for cluster $C_i$, the within-cluster sum of squares cost for just the points in $S_{out}$ cannot exceed the total within-cluster sum of squares cost, which is $|C_i|D_i^2$. All the points in $S_{out}$ are more than $\gamma D_i$ distance away from $c_i$. Thus the within-cluster sum of squares cost for just the points in $S_{out}$ is strictly greater than $|S_{out}|(\gamma D_i)^2$. Hence $$|S_{out}|(\gamma D_i)^2 < |C_i|D_i^2$$

or $$|S_{out}| < |C_i|/\gamma^2$$

This holds for every cluster and for every iteration. Thus, we have that at most a $1/\gamma^2$ fraction of the uncovered points stay uncovered at the end of every iteration. Thus at the end of $\mu$ iterations at most $|U|(1/\gamma^2)^\mu$ points are still uncovered. The method stops iterating when there are at most r uncovered points. Thus the number of iterations $\mu$ satisfy $|U|(1/\gamma^2)^\mu \leq r$. Thus $\mu = O(\log n/(2 \log \gamma))$ for $n = |U|/r$.

The total AOOP cost therefore is $O(OPT(1+d\gamma^2)/(2 \log \theta\gamma \log n z))$. In each iteration at most r points (VM configurations) are added to the set V. Hence at the end of the method the size of V is at most $O(r \log n/2 \log \gamma)$. In other words, the method is a $$\left( O\left(\frac{\log n}{2\log\gamma}\right), O\left(\frac{1+d\gamma^2}{2\log\gamma}\theta\log n\right) \right)$$

bi-criterion approximation method for any $\gamma > 1$.

Lemma 2:

Let $C_i$ be a cluster of a k-means solution with center $c_i$ (that is $c_i$ is the centroid of $C_i$ and satisfies $$c_i = \frac{1}{|c_i|} \sum_{u_j \in C_i} u_j).$$

Let c be any point. Then $$\sum_{u_j \in C_i} \|u_j - c\|_2^2 = \sum_{u_j \in C_i} \|u_j - c_i\|_2^2 + |C_i|\|c - c_i\|_2^2$$

Proof

Consider a point $u_j \in C_i$. Let vector $\vec{S} = (s_1, s_2, \ldots, s_d)$ represent $c_i - c$. Let vector $\vec{W}_j = (w_1(j), w_2(j), \ldots, w_d(j))$ represent $u_j - c_i$. Then:

$$\|u_j - c\|_2^2 = \|(u_j - c_i) + (c_i - c)\|_2^2 = \|\vec{W}_j - \vec{S}\|_2^2$$

Also $$\|\vec{W}_j - \vec{S}\|_2^2 = \sum_{m=1}^{d}(w_m(j) - s_m)^2$$

Which is equal to $$\sum_{m=1}^{d} w_m^2(j) + \sum_{m=1}^{d} s_m^2 - 2\sum_{m=1}^{d} s_m w_m(j)$$

On the other hand, $c_i$ being the centroid of the points in $C_i$ satisfies $$c_i = \frac{1}{|c_i|} \sum_{u_j \in C_i} u_j = c_i.$$

Hence $$\sum_{u_j \in C_i} \vec{W}_j = \sum_{u_j \in C_i} (u_j - c_i) \text{ or}$$

$$\sum_{u_j \in C_i} w_m(j) = 0, \forall m$$

Multiplying the last equation by $s_m$ and adding up for all dimensions m we get:

$$\sum_{m=1}^{d} s_m \sum_{u_j \in C_i} w_m(j) = \sum_{m=1}^{d} \sum_{u_j \in C_i} s_m w_m(j) = 0$$

or $$\sum_{u_j \in C_i} \sum_{m=1}^{d} s_m w_m(j) = 0$$

Thus, adding up equation $$\sum_{m=1}^{d} w_m^2(j) + \sum_{m=1}^{d} s_m^2 - 2\sum_{m=1}^{d} s_m w_m(j)$$

for all $u_j \in C_i$, and using $$\|u_j - c\|_2^2 = \|(u_j - c_i) + (c_i - c)\|_2^2 = \|\vec{W}_j - \vec{S}\|_2^2$$

and

-continued $$\|\vec{W}_j - \vec{S}\|_2^2 = \sum_{m=1}^{d} (w_m(j) - s_m)^2$$

we get $$\|u_j - c\|_2^2 = \sum_{u_j \in C_i} \sum_{m=1}^{d} w_m^2(j) + \sum_{u_j \in C_i} \sum_{m=1}^{d} s_m^2$$

Also, by the definition of $\vec{W}_j$ it follows that $$\sum_{u_j \in C_i} \sum_{m=1}^{d} w_m(j)^2 = \sum_{u_j \in C_i} \|u_j - c_i\|_2^2$$

Finally, since $\vec{S} = c_i - c$ $$\sum_{u_j \in C_i} \sum_{m=1}^{d} s_m^2 = \sum_{u_j \in C_i} \|c_i - c\|_2^2 = |C_i| \|c_i - c\|_2^2$$

Thus, from $$\|u_j - c\|_2^2 = \sum_{u_j \in C_i} \sum_{m=1}^{d} w_m^2(j) + \sum_{u_j \in C_i} \sum_{m=1}^{d} s_m^2$$

it follows that for cluster $C_i$:

$$\sum_{u_j \in C_i} \|u_j - c\|_2^2 = \sum_{u_j \in C_i} \|u_j - c_i\|_2^2 + |C_i| \|c_i - c\|_2^2$$

Lemma 3:

The cost (within-cluster sum of squares) of the best k-means solution is a lower bound on the over-provisioning overhead (AOOP) cost of the optimal solution $(V^*, f^*)$ for points U with $|V^*| \leq k$.

Proof

Consider an optimal (AOOP) solution $(V^*, f^*)$ for points U with $|V^*| \leq k$. This solution induces a $|V^*|$-clustering of the points U around a set of centers $V^*$. Let $C_1, C_2, \ldots, C_{|V^*|}$ be these clusters. And let $v_1, v_2, \ldots, v_{|V^*|}$ be their centers from the set of $V^*$ respectively.

Consider a k-means clustering with these same clusters. It will have centers $c_1, c_2, \ldots, c_{|V^*|}$, where each $c_i$ is the centroid of its cluster $C_i$. By Lemma 2 we therefore have for any cluster $1 \leq i \leq |V^*|$:

$$\sum_{u_j \in C_i} \|u_j - v_i\|_2^2 = \sum_{u_j \in C_i} \|u_j - c_i\|_2^2 + |C_i| \|v_i - c_i\|_2^2$$

Note that $\|v_i - c_i\|_2^2 \geq 0$. Thus by adding for all i we have $$\sum_{i=1}^{|V^*|} \sum_{u_j \in C_i} \|u_j - v_i\|_2^2 \geq \sum_{i=1}^{|V^*|} \sum_{u_j \in C_i} \|u_j - c_i\|_2^2$$

Thus the AOOP cost of the optimum solution $(V^*, f^*)$ (left hand side of the inequality) is at least the within-cluster sum of squares on a k-means solution (right hand side of the inequality) that uses the clusters $C_1, C_2, \ldots, C_{|V^*|}$. Since the optimal k-means solution for these points can only have lower within-cluster sum of squares cost, the claim holds.

The Combined Cost AOOP Embodiment

We now consider a more general version of the problem. We assume that we are also given a set W of possible choices for VM configurations. That is, the set of selected VM configurations V should only include VM configurations from W. Hence there is an additional constraint of $V \cup W$. Note that even when the set W is not specified explicitly the set of possible VM configurations are limited. This is because there are at most $|U|$ distinct resource requirements in the expected usage set U for any one resource K. Only one of these U values for resource K should be configured in a VM because otherwise the resource would always get wasted due to over-provisioning. Thus any VM configuration $v \in V$ can have at most $|U|$ distinct values for any resource K. Since this holds for all possible d resources the possible set of VM configurations for V has size no more than $|U|^d$. That is the set W, whether explicit or implicit is bounded in size by $|W| \leq |U|^d$.

We also allow each VM configuration w in W to be associated with a cost p(w) reflecting the downside of selecting w in VM configurations V. The goal then is to compute the solution $(V, f)$ for which a combined cost that includes both the over-provisioning overhead cost (AOOP cost) as well as the cost of VM configurations in $|V|$ is minimized. In particular we want to minimize:

$$\sum_{w \in V} p(w) + \sum_{u \in U} \|f(u) - u\|_2^2$$

We now describe the method for solving this problem. As before, the method works in iterations. Also, in the beginning of the method V is an empty set of VM configurations, $f^C$ is an empty mapping function and all the points in U are marked uncovered. In each iteration the method selects a new VM configuration w from the set W to add to the set V. It also selects a set of uncovered points C from U and marks them covered by w and updates the mapping function $f^C$ appropriately. The method iterates until all points in V are covered.

An iteration of the method works as follows. First it selects a new (that is not already in V) VM configuration w from the set W. Then for the selected VM configuration w it computes subsets of uncovered points as follows. Let X be the set of all uncovered points in U that are dominated by the point w. That is X includes all uncovered points v in U for which $w \geq v$. Let the points in X be arranged as $x_1, x_2, \ldots, x_{|X|}$ in non-decreasing order of their distance from the point w. Consider $|X|$ subsets $X_1, X_2, \ldots, X_{|X|}$ of X where the set $X_i$ consists of the i points $x_1, x_2, \ldots, x_i$. The cost of set $X_i$ is the VM configuration cost of w plus the total over provisioning cost of its i points with respect to the VM configuration w. Thus cost of $X_i$ is:

$$C(X_i) = p(w) + \sum_{u \in X_i} \|w - u\|_2^2$$

The method then picks that VM configuration w and that set $X_i$ of uncovered points for it for which the average cost $C(X_i)/|X_i|$ is minimized among all other such sets. It adds point w to the set V, marks all points in $X_i$ as covered and updates the mapping function $f^C(u)=w$, $\forall_u \in X_i$.

Figure 8:
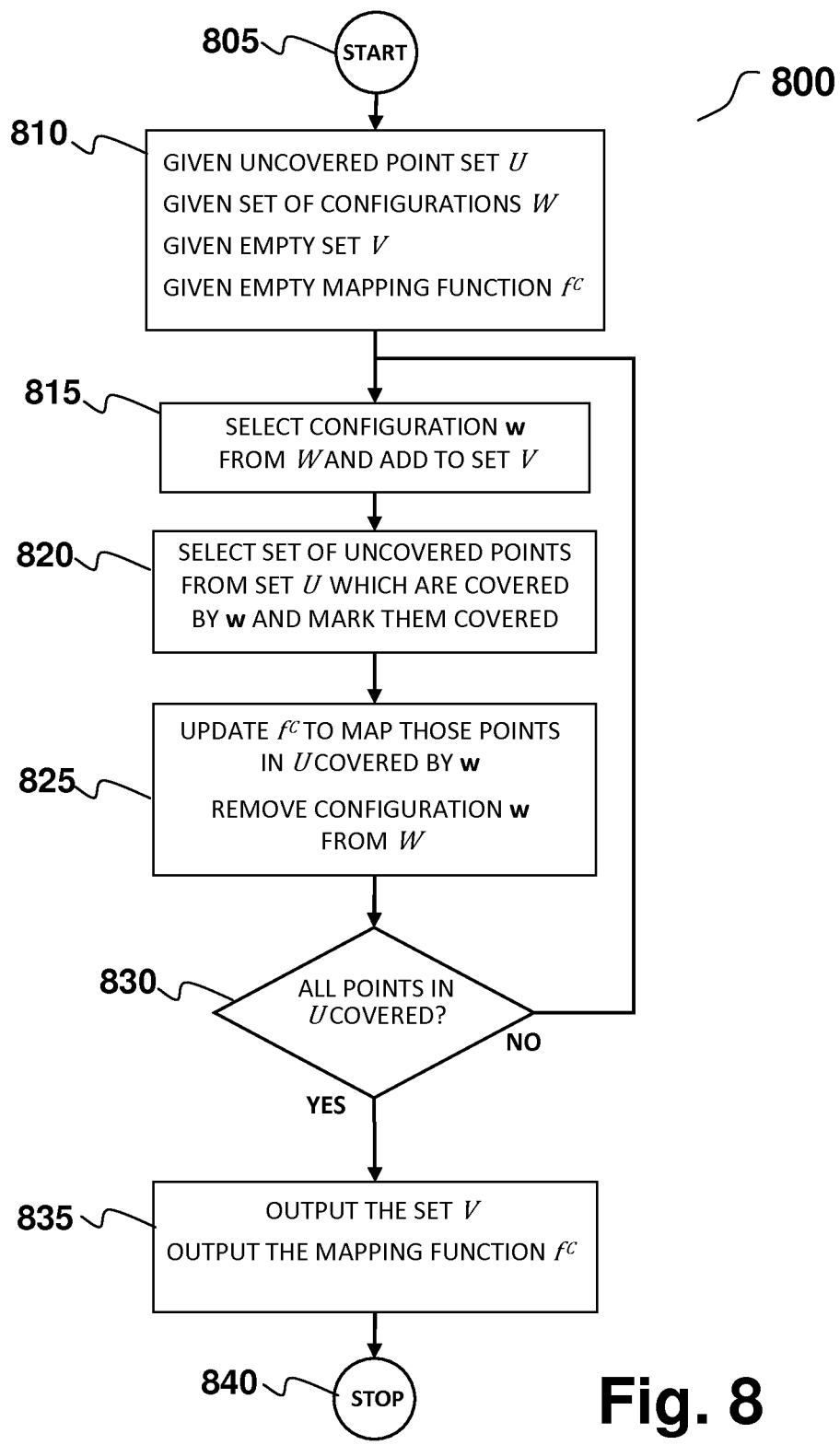
FIG. 8 is flowchart of an embodiment according to yet another aspect of the disclosed method.

Referring to FIG. 8 there may be seen a flowchart of an embodiment of this method. The method commences at step 805. At step 810 there is provided an uncovered point set U, a set of configurations W, an empty set V, and an empty mapping function $f^C$. At step 815 a configuration w is selected from W and added to set V.

At step 820 the method selects a particular set of uncovered points from U which are covered by w and marks them covered. These particular points are those for which $C(X_i)/|X_i|$ is minimized as described supra. At step 825 the mapping function $f^C$ is updated to map those points in U covered by w, and the configuration w is removed from the set W.

At step 830 a test is made to determine if all the points in U have been covered. In the event they have not, control returns to step 815 for another iteration of w point choosing. In the event that all the points in U have been covered, the control moves to step 835 where the set V and the mapping function $f^C$ are output. The method then terminates at step 840.

We now analyze the running time of the method. Note that each iteration involves considering at most |U| sets $X_i$ for the |W| possible VM configurations. This implies a total of |U||W| sets whose cost has to be computed and for which the set of minimum cost is to be found. Both these operations can be done in time linear in the number of sets (|U||Q|), since the cost of set $X_{i+1}$ can be obtained from the cost of set $X_i$ via a single operation. Note that there are at most |U| iterations since in each iteration at least one more uncovered point gets covered. Hence the total running time of the method is $O(|U|^2|W|)$. As described before |W| is bounded by $|U|^d$. Hence the method runs in time $O(|U|^{d+2})$, and hence has a polynomial running time for a fixed number of resources d.

Theorem 4: The method is a $O(\log|U|)$-approximation.

Proof

The proof is along the line of the approximation bound for the greedy set cover method [V. Chvátal; A greedy heuristic for the set-covering problem; Mathematics of Operations Research, 4(3):233-235, 1979; hereby incorporated by reference]. Consider an optimal solution. Let it pick VM configurations $w_1^*, w_2^*, \ldots$. Let it cover the set of points $X_i \subseteq U$ using the VM configuration $w_i^*$. Thus every $u \subseteq U$ must be in some $X_i$. Also the total cost of the optimal solution $OPT=\Sigma_i C(X_i^*)$ must be the least possible. Here $$C(X_i^*) = p(w_i^*) + \sum_{u \in X_i^*} \|w_i^* - u\|_2^2$$

Consider an iteration of the method where it selects VM configuration w and a set $X_i$ for which the average cost $C(X_i)/|X_i|$ is minimized. We first show that at this iteration no subset $Y \subseteq U$ of uncovered points has lower average cost than $X_i$. Let there exist a VM configuration W and a set Y of uncovered points for which the average cost is strictly lower than the average cost of $X_i$. Arrange the points in Y in non-decreasing order of their distance from the point w'. Let these points be $y_1, y_2, \ldots, y_j$. Note that Y cannot be a set that was considered by the method while considering the VM configuration w', because otherwise it would have picked this set instead of the set $X_i$. Thus, there must exist a point $y_1$ in Y and an uncovered point $y'_1 \in U$, which is not in Y but which is closer to w' than the point $y_1$. Thus by replacing point $y_1$ in Y with point $y_1'$ the average cost of Y can be brought down even more. This process can be repeated until none of the uncovered points outside Y has lower cost than any point in Y. In each step the average cost of Y strictly goes down. Thus, the final Y also has strictly less average cost than the set $X_i$ picked by the method. However, this cannot be the case since the final Y is in a form that it would have been considered by the method when considering the VM configuration w'. Therefore such a set Y cannot exist.

We charge the cost $C(X_i)$ of the set $X_i$ picked by the method uniformly among the elements of the set $X_i$. Thus each element of $X_i$ gets charged the cost $C(X_i)/|X_i|$. Note that each point $u \in U$; gets only charged once. This is because once it is charged it becomes covered and is therefore not included in any of the sets considered by the method in the subsequent iterations. Thus the total charge on all points $u \in U$ equals the total cost of the solution found by the method.

Consider a set $X_i^*$ of the optimal solution. Let $X_i^*$ have $|X_i^*|=r$ elements. Let us arrange these r elements of $X_i^*$ in non-decreasing order in which they get charged. Let this arrangement be $x_r^*, x_{r-1}^*, \ldots, x_1^*$. Just before when the point $x_j^*$ is charged there are j uncovered points $x_j^*, x_{j-1}^*, \ldots, x_1^*$, in this set. Therefore the method is able to find a set with average cost at most $C(X_i^*)/j$. Hence the charge on the point $x_j^*$ is no more than $C(X_i^*)/j$. Thus, the total charge on all the points in the set $X_i^*$ is at most $\Sigma_{j=1}^r C(X_i^*)/j = C(X_i^*)O(\log|X_i^*|)$. Adding for all sets $X_i^*$ we get that the total charge on all points in U is $$\sum_i C(X_i^*) \, O(\log|X_i^*|) \le O(\log|U|) \sum_i C(X_i^*)$$

However $\Sigma_i C(X_i^*)$ is the cost OPT of the optimal solution. Thus the total cost of the solution found by the method is at most $O(|\log|U|)$ times the cost of the optimal solution.

The Combined Cost MOOP Embodiment

Here the goal is to compute the solution (V, f) for which $$\max_{u \in U} \|f(u) - u\|_2$$

which is directly proportional to the maximum over-provisioning overhead cost (MOOP cost), is minimized. In addition, we want the size |V| to be at most bounded by a VM configuration budget r.

In this cost metric the MOOP cost is defined using the distance norm. We later show how to extend to MOOP cost defined based on the infinity norm. We now describe the method for solving this problem.

The method has two phases. In the first phase the method does a binary search for a value that comes close to the optimal MOOP cost $\alpha^*$ for the size $|V| \le r$. Let $\alpha$ be the current guess for this value. The method creates a graph $G_\alpha=(V_\alpha, E_\alpha)$. Its vertex set $V_\alpha=W$, where W is the (implicit) set of all possible VM configurations that can be selected for V, as defined supra. There is an undirected edge $(u, v) \in E_\alpha$ if and only if the following two conditions hold. Either $u \geq v$ or $v \geq u$. That is one of the points must dominate the other point. In addition the distance between the points u, v is no more than $\alpha$. That is $\|u-v\|_2 \leq \alpha$. Here u, $v \in W$ are possible VM configurations from the set W. Next the method computes the square graph $G_\alpha^2$ of $G_\alpha$. The graph $G_\alpha^2$ has only those vertices $V_\alpha$ of $G_\alpha$, that correspond to the points in the set U. For u, $v \in U$ it has an undirected edge $(u, v)$ if either $(u, v)$ $E_\alpha$ or if there exists a $w \in V_\alpha$ such that both edges $(u, w)$ and $(w, v)$ are in $E_\alpha$. Next the method finds a maximal independent set [ ]$I_\alpha$ of $G_\alpha^2$. If $|I_\alpha| \geq r$ then the guess $\alpha$ is too high and is too low otherwise. Based on this the binary search for $\alpha$ is continued until the method has two close guesses for $\alpha$ one a lower bound and one an upper bound for $\alpha^*$. At this point the method sets $\alpha$ to the higher of these two values and proceeds to phase two.

In phase two the method has a good guess $\alpha$ for the optimal MOOP cost $\alpha^*$. In addition, for this value of $\alpha$ the method has an independent set $I_\alpha$, of the graph $G_\alpha^2$, with at most r points. That is $|I_\alpha| \leq r$. The method uses the set $I_\alpha$ to cluster the points of U into $|I_\alpha|$ clusters $C_1, C_2, \ldots$. There is one cluster $C_i$ for each point $c_i$ in $I_\alpha$. A point $u \in U$ is put into cluster $C_i$ if its nearest point in the set $I_\alpha$ is $c_i$ (ties broken arbitrarily). Next, for each cluster $C_i$ the tightest point $c_i'$ that dominates all the points in $C_i$ is computed. More formally, the j-th coordinate of the point c is set to $\{\max(u_j) | u \in U\}$, the largest possible j-th coordinate $u_j$ of any point u in U. The set of VM configurations V is set to the collection of $|I_\alpha|$ points $c_j'$. The mapping function $f^C$ maps points of cluster $C_i$ to the point $c_i'$. That is $f^C(u)=c_i', \forall u \in C_i, \forall i$.

Figure 9:
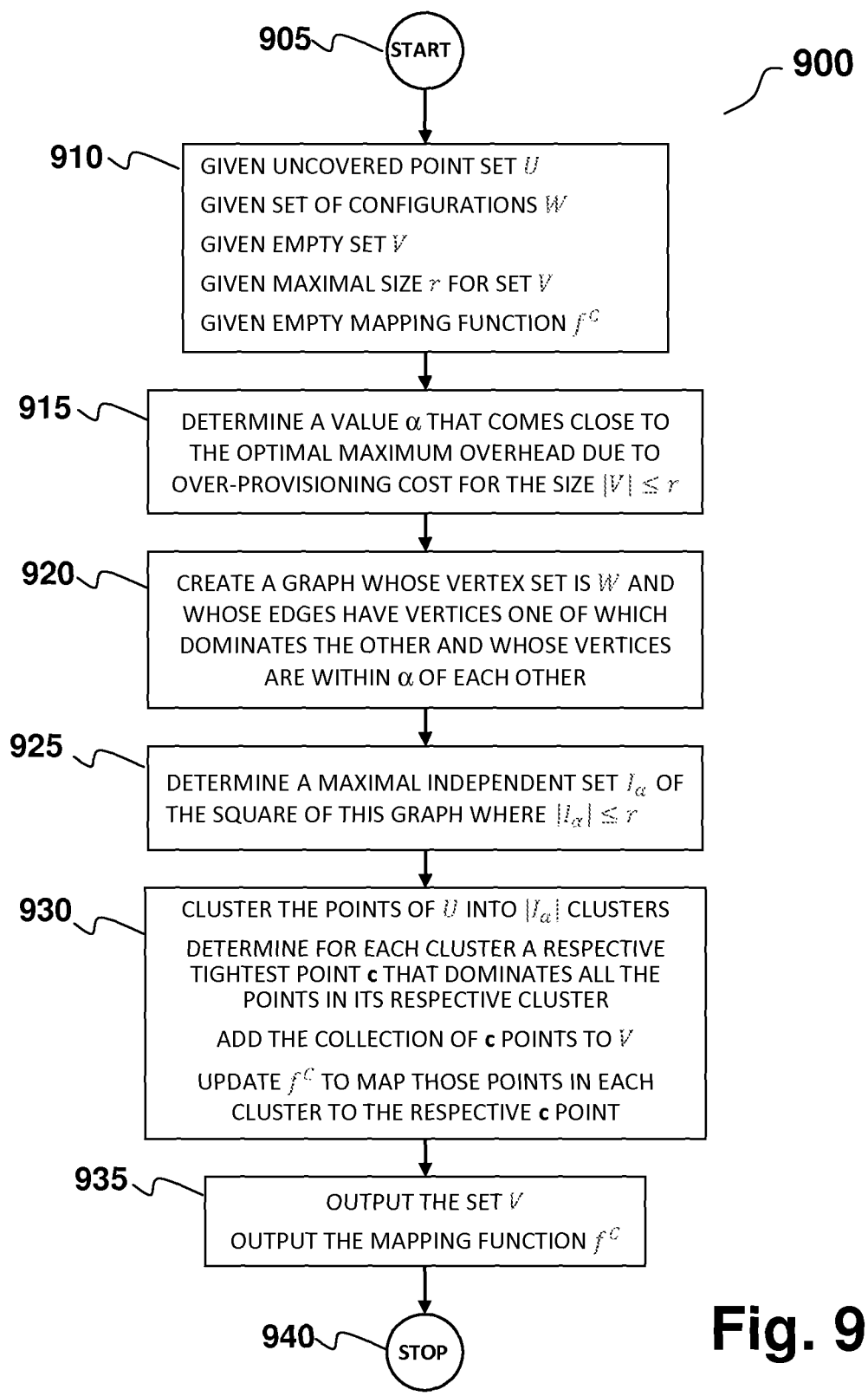
FIG. 9 is flowchart of an embodiment according to yet another aspect of the disclosed method.

Referring to FIG. 9 there may be seen a flowchart of an embodiment of this method. The method commences at step 905. At step 910 there is provided an uncovered point set U, a set of configurations W, an empty set V, a maximal size r for set V, and an empty mapping function $f^C$.

At step 915 a value $\alpha$ is determined that comes close to the optimal maximum overhead due to over-provisioning cost for the size $|V| \leq r$ using the method described supra.

At step 920 the method creates a graph whose vertex set is W and whose edges have vertices one of which dominates the other and whose vertices are within a distance $\alpha$ of each other.

At step 925 a maximal independent set $I_\alpha$ of the square of the graph of step 920 is formed where $|I_\alpha| \leq r$ using the method described supra. At step 930 the points of U are clustered into a quantity $|I_\alpha|$ clusters. For each of these clusters a respective tightest point c is determined that dominates all the points in its respective cluster. Each of these respective c points is then added to V and the mapping function $f^C$ is updated to map those points in each cluster to their respective c point.

At step 935 the set V and the mapping function $f^C$ are output. The method then terminates at step 940.

The running time of the method is dominated by the search for the best $\alpha$ in the first phase. The possible values for a can be bounded in the range $(d_{min}, d_{max})$, where $d_{min}(d_{max})$ is the smallest (largest) distance between any two points in W. Since the method uses binary search in each iteration the size of this range is halved. The method stops the search when the range size is at most $\epsilon$ for some error tolerance $\epsilon$. Thus, overall the number of iterations is at most $$= \log_2 \frac{d_{min} - d_{max}}{\epsilon}.$$

The other main operation is the computation of the maximal independent of the graph. This involves repeatedly picking a node and deleting it and its neighbors from the graph until the graph is empty. This operation therefore has time complexity which is linear in the size of the graph $G_\alpha^2$. Since $G_\alpha^2$ has $|U|$ nodes it has at most $|U|^2$ edges.

Theorem 5: The method is a $4\sqrt{d}$-approximation method.

Proof

Let the value for $\alpha$ be narrowed to the interval $\alpha_1 \leq \alpha \leq \alpha_2$ via binary search. Thus $|I_{\alpha_1}| > r$ and $|I_{\alpha_2}| < r$ and $\alpha_2 - \alpha_1 \leq \epsilon$. From Lemma 6 (infra) it follows that $\alpha_1 \leq \alpha^*$ and hence $\alpha_2 \leq \alpha^* + \epsilon$. The method sets $\alpha = \alpha_2$. Note that for this setting $|I_\alpha| < r$. The method clusters points of U into at most r clusters, such that there is one cluster $C_i$ for each point $c_i$ in $I_\alpha$. A point $u \in U$ is put into cluster $C_i$ if its nearest point in the set $I_\alpha$ is $c_i$ (ties broken arbitrarily). Note that every point $u \in U$ has an edge in $G_\alpha^2$ to at least one point in $I_\alpha$, for otherwise $I_\alpha$ cannot be a Maximal Independent Set. By construction of the graphs $G_\alpha$ and $G_\alpha^2$, it therefore follows that any point $u \in U$ is within distance $2\alpha$ of some point $c_i$ in $I_\alpha$. In particular every point in the cluster $C_i$ must be within distance $2\alpha$ of the point $c_i$. Thus on any dimension, the coordinate difference between the points u and $c_i$ cannot exceed $2\alpha$. Thus, the tightest point c that dominates all the points in $C_i$ cannot exceed point $c_i$ by more than $2\alpha$ on any dimension as well. Thus, on any dimension, the coordinate difference between point $c_j'$ and a point $u \in U$ is at most $4\alpha$. Thus the MOOP cost of this solution satisfies $$\max_{u \in U} \|f(u) - u\|_2 \leq \sqrt{\sum_{k=1}^{d} (4\alpha)^2} = 4\sqrt{d} \, \alpha^* \leq 4\sqrt{d} \, (\alpha^* + \epsilon)$$

Thus the method finds a feasible solution with at most r points $c_i'$ in V and for which the MOOP cost is at most $4\sqrt{d}$ times the optimal MOOP cost (with an additive term that can be made arbitrarily small).

Lemma 6: If $\alpha > \alpha^*$ then $|I_\alpha| \leq r$

Proof

Consider the optimal solution $(V^*, f^*)$. There are at most r points in $V^*$. Also, any point u of U is within distance $\alpha^*$ of some point in V'. Consider the set of points $U_i \subseteq U$ that are within distance $\alpha'$ of a pointy $v^*$ in $V^*$. Let u, $v \in_i$ be two distinct points. Since $\alpha > \alpha^*$, both edges $(u, v^*) \in E_\alpha$ and $(v, v^*) \in E_\alpha$ and therefore $(u, v^*) \in G_\alpha^2$. Thus there is an edge $(u, v)$ in $G_\alpha^2$. This holds for every pair of nodes u, $v \in U_i$. Let x, y be two distinct points in the Maximal Independent Set (MIS) $I_\alpha$. Then x and y cannot be connected in $G_\alpha^2$. This can be seen as follows. Without loss of generality let x be selected first by the MIS method. Consider the time when that happens. If there was an edge $(x, y)$ in $G_\alpha^2$ then both these points would get removed from G before the next selection is made by the MIS method. Hence y cannot be in $I_\alpha$. The other case is similar. Thus, x and v have to be in distinct clusters $C_i$. However there are at most r clusters in $G_\alpha^2$. Thus, $|I_\alpha| \leq r$.

The MOOPR Cost Embodiment

Here the goal is to compute the solution (V, $f$) for which $$\max_{u \in U} \|f(u) - u\|_\infty$$

which is directly proportional to the maximum over-provisioning overhead quantified using point ratios (MOOPR cost), is minimized. In addition, we want the size |V| to be at most bounded by a VM configuration budget r.

As in the section on the MOOP cost embodiment the first phase of the method is a binary search for a value $\alpha$ that comes close to the optimal MOOPR cost $\alpha^*$ for the size |V|≤r. Let $\alpha$ be the guess for this value at the beginning of an iteration of the binary search. All points in U are marked uncovered and a set S is initialized to be empty. The method picks an uncovered point x from U and adds it to S and marks it covered. It also picks all uncovered points x from U for which $x/\alpha \le i \le \alpha x$ and marks them covered as well. Here scaling a point by a scalar involves scaling each coordinate of the point by the scalar. The method repeats this process until no more uncovered point remain in U. If |S|>r then the $\alpha$ value is increased and is reduced otherwise. Based on this the binary search for $\alpha$ is continued until the method has two close guesses for $\alpha$ one a lower bound and one an upper bound for $\alpha'$. At this point the method sets $\alpha$ to the higher of these two values, uses the set S for this higher value of a and proceeds to phase two.

In phase two the method has a good guess $\alpha$ for the optimal MOOPR cost $\alpha^*$. In addition, for this value of $\alpha$ the method has a set S with at most r points. For every x∈S a point ax is added to the set V. The mapping function $f^C$ is set to map a point y∈U to that point x∈V for which y≤x and for which the ratio $\|x/y\|_2$ is minimized.

Theorem 7: The method finds a feasible solution with MOOPR cost no more than $(\alpha^*)^2$ Proof First we show that if $\alpha \ge \alpha^*$ then |S|≤r in the first phase of the method. Let x from U be added to S by the method in this phase. Let y∈V* satisfy $f^*(x)=y$ in the optimal solution. Then, for all points u∈U, with $f^*(u)=y$ we have that y≥u as well as $\|f^*(u)/u\|_\infty = \|y/u\|_\infty \le \alpha^*$. Combining these constraints we get $$x/\alpha \le x/\alpha^* \le y/\alpha^* \le u \le y \le \alpha^* x \le \alpha x$$

Thus it follows that each such point u satisfies $x/\alpha < u < \alpha x$ and therefore got marked by the method and is therefore not in S. Thus, all points in S map to distinct elements of V via the function $f$. Since |V*|≤r, it follows that |S|≤r.

Using the previous result and using a similar argument as in the proof of Theorem 5 it follows that $\alpha \le \alpha^* + \epsilon$ and |S|≤r and therefore |V|≤r in phase two of the method. Also the way the method operates it is ensured that for every point y∈U there exists a point x∈S (for which it gets marked) such that $x/\alpha \le y \le \alpha x$. Also since z=αx∈V it follows that for every point y∈U there exists a point z∈V such that y≤z, as well as $z/\alpha^2 = x/\alpha \le y$ or $\|z/y\|_\infty \le \alpha^2$. Since $\alpha$ is almost $\alpha^*$ (within a small error $\epsilon$) the claim follows.

Figure 10:
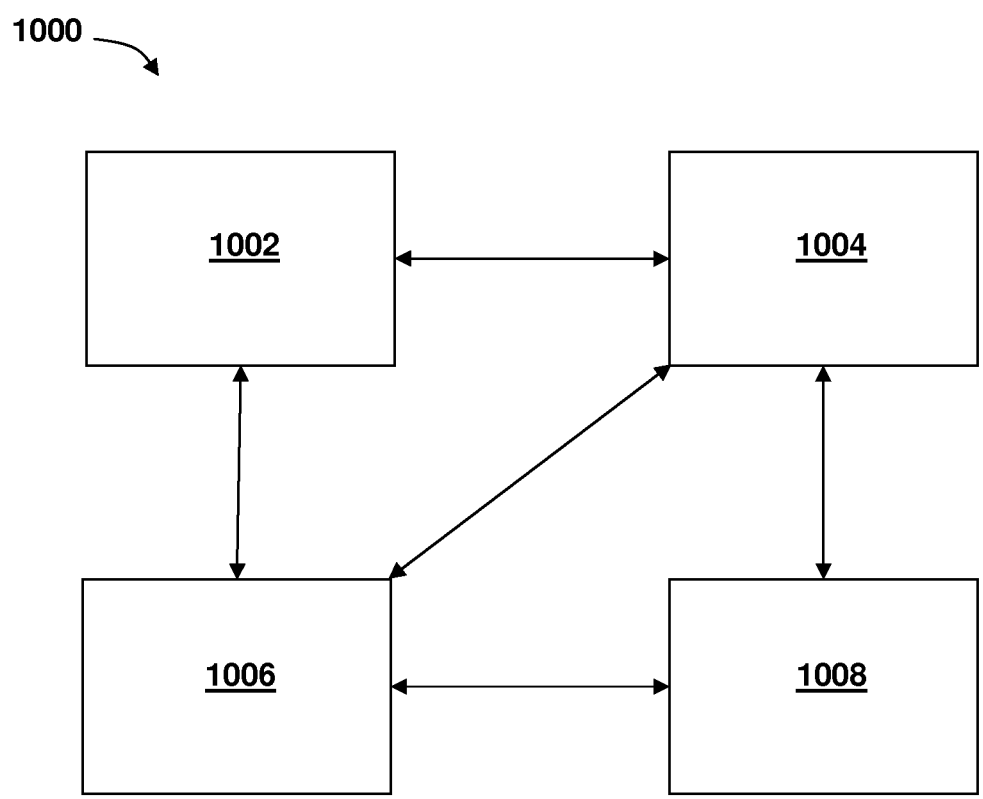
FIG. 10 illustrates a block diagram of a network equipment processor assembly according to an embodiment of the invention.

Referring now to FIG. 10, a assembly 1000 which in certain embodiments may be used in the determination of mapping functions and sets of configurations, includes a network equipment processor element 1006 (e.g., a central processing unit (CPU) and/or other suitable processor(s)), a memory 1008 (e.g., random access memory (RAM), read only memory (ROM), and the like), a cooperating module/process 1002, and various input/output devices 1004 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 1002 can be loaded into memory 1008 and executed by network equipment processor 1006 to implement the functions as discussed herein. As well, cooperating process 1002 (including associated data structures) can be stored on a tangible, non-transitory computer readable storage medium, for example magnetic or optical drive or diskette, semiconductor memory and the like.

Therefore what has been disclosed is a method which facilitates solution of the problem of speeding up on-demand VM provisioning for auto-scaling in the cloud.

Note, in the preceding discussion a person of skill in the art would readily recognize that steps of various above-described methods can be performed by appropriately configured network processors. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices are all tangible and non-transitory storage media and may be, e.g., digital memories, magnetic storage media such as a magnetic disks and magnetic tapes, hard drives, or optically readable digital data storage media. The embodiments are also intended to cover network element processors programmed to perform said steps of the above-described methods.

Numerous modifications, variations and adaptations may be made to the embodiment of the invention described above without departing from the scope of the invention, which is defined in the claims.

What is claimed is:

1. A method of identifying a set of pre-provisioned machine configurations and an associated mapping function for mapping each of a plurality of given machine configurations to said set of pre-provisioned machine configurations so as to produce a resource cost for said set of pre-provisioned machine configurations, the method comprising the steps of:

clustering said plurality of given machine configurations into a quantity of clusters less than or equal to a pre-specified amount based on a distance from each of the plurality of the given machine configurations to the center of each of the quantity of a clusters;

determining a respective dominant provisioning machine configuration by determining a respective tightest point that dominates the plurality of given machine configurations in each cluster of said quantity of clusters;

determining an overall over-provisioning resource cost associated with the respective quantity of clusters and associated respective dominant provisioning machine configurations; and assigning to said mapping function the respective associated dominant provisioning machine configuration of each respective cluster of said quantity of clusters as the target for the given machine configurations of each respective cluster of said quantity of clusters.

2. A method as claimed in claim 1 wherein said resource cost is selected from the group consisting of an average cost, a maximum cost, and a maximum cost quantified using ratio points.

3. A method as claimed in claim 2 further comprising the steps of:
varying said quantity of clusters to determine a quantity less than said pre-specified amount for which said overall over-provisioning resource cost is substantially minimized; and
using that quantity of clusters for which said overall over-provisioning resource cost is substantially minimized in the assigning step.

4. A method as claimed in claim 2 wherein said set of respective dominant provisioning machine configurations is selected from a pre-provisioned set of provisioned machine configurations.

5. A method as claimed in claim 4 further comprising the steps of:
varying said quantity of clusters to determine a quantity less than said pre-specified amount for which said overall over-provisioning resource cost is substantially minimized; and
using that quantity of clusters for which said overall over-provisioning resource cost is substantially minimized in the assigning step.

6. A method as claimed in claim 4 further comprising the steps of:
associating an operating cost with each of said given set of provisioned machine configurations; and
including said operating costs in the determining step.

7. A method as claimed in claim 6 further comprising the steps of
varying said quantity of clusters to determine a quantity less than said pre-specified amount for which said overall over-provisioning resource cost is substantially minimized; and
using that quantity of clusters for which said overall over-provisioning resource cost is substantially minimized in the assigning step.

8. A method as claimed in claim 1 wherein
varying said quantity of clusters to determine a quantity less than said pre-specified amount for which said overall over-provisioning resource cost is substantially minimized; and
using that quantity of clusters for which said overall over-provisioning resource cost is substantially minimized in the assigning step.

9. A method as claimed in claim 1 wherein said set of respective dominant provisioning machine configurations is selected from a pre-provisioned set of provisioned machine configurations.

10. A method as claimed in claim 9 further comprising the steps of:
varying said quantity of clusters to determine a quantity less than said pre-specified amount for which said overall over-provisioning resource cost is substantially minimized; and
using that quantity of clusters for which said overall over-provisioning resource cost is substantially minimized in the assigning step.

11. A method as claimed in claim 9 further comprising the steps of:
associating an operating cost with each of said given set of provisioned machine configurations; and
including said operating costs in the determining step.

12. A method as claimed in claim 11 further comprising the steps of
varying said quantity of clusters to determine a quantity less than said pre-specified amount for which said overall over-provisioning resource cost is substantially minimized; and
using that quantity of clusters for which said overall over-provisioning resource cost is substantially minimized in the assigning step.

13. A method as claimed in claim 1 further comprising the steps of:
associating an operating cost with each of said given set of provisioned machine configurations; and
including said operating costs in the determining step.

14. A method as claimed in claim 13 further comprising the steps of
varying said quantity of clusters to determine a quantity less than said pre-specified amount for which said overall over-provisioning resource cost is substantially minimized; and
using that quantity of clusters for which said overall over-provisioning resource cost is substantially minimized in the assigning step.

15. An apparatus for identifying a set of pre-provisioned machine configurations and an associated mapping function for mapping each of a plurality of given machine configurations to said set of pre-provisioned machine configurations so as to produce a resource cost for said set of pre-provisioned machine configurations, the apparatus comprising:
a data storage; and
a processor communicatively connected to the data storage, the processor being configured to:
cluster said plurality of given machine configurations into a quantity of clusters less than or equal to a pre-specified amount based on a distance from each of the plurality of the given machine configurations to the center of each of the quantity of a clusters;
determine a respective dominant provisioning machine configuration by determining a respective tightest point that dominates the plurality of given machine configurations in each cluster of said quantity of clusters; and
determine an overall over-provisioning resource cost quantified using point ratios associated with the respective quantity of clusters and associated respective dominant provisioning machine configurations; and
assign to said mapping function the respective associated dominant provisioning machine configuration of each respective cluster of said quantity of clusters as the target for the given machine configurations of each respective cluster of said quantity of clusters.

16. An apparatus as claimed in claim 15 wherein said resource cost is selected from the group consisting of an average cost, a maximum cost, and a maximum cost quantified using ratio points.

17. An apparatus as claimed in claim 16 wherein the processor is further configured to vary said quantity of clusters to determine a quantity less than said pre-specified amount for which said overall over-provisioning resource cost is substantially minimized; and use that quantity of clusters for which said overall over-provisioning resource cost is substantially minimized in the assigning step.

18. An apparatus as claimed in claim 16 wherein said set of respective dominant provisioning machine configurations is selected from a pre-provisioned set of provisioned machine configurations.

19. An apparatus as claimed in claim 18 wherein the processor is further configured to vary said quantity of clusters to determine a quantity less than said pre-specified amount for which said overall over-provisioning resource cost is substantially minimized; and use that quantity of clusters for which said overall over-provisioning resource cost is substantially minimized in the assigning step.

20. An apparatus as claimed in claim 18 wherein the processor is further configured to associate an operating cost with each of said given set of provisioned machine configurations; and include said operating costs in the determining step.

21. An apparatus as claimed in claim 20 wherein the processor is further configured to vary said quantity of clusters to determine a quantity less than said pre-specified amount for which said overall over-provisioning resource cost is substantially minimized; and use that quantity of clusters for which said overall over-provisioning resource cost is substantially minimized in the assigning step.

22. An apparatus as claimed in claim 15 wherein the processor is further configured to vary said quantity of clusters to determine a quantity less than said pre-specified amount for which said overall over-provisioning resource cost is substantially minimized; and use that quantity of clusters for which said overall over-provisioning resource cost is substantially minimized in the assigning step.

23. An apparatus as claimed in claim 15 wherein said set of respective dominant provisioning machine configurations is selected from a pre-provisioned set of provisioned machine configurations.

24. An apparatus as claimed in claim 23 wherein the processor is further configured to vary said quantity of clusters to determine a quantity less than said pre-specified amount for which said overall over-provisioning resource cost is substantially minimized; and use that quantity of clusters for which said overall over-provisioning resource cost is substantially minimized in the assigning step.

25. An apparatus as claimed in claim 23 wherein the processor is further configured to associate an operating cost with each of said given set of provisioned machine configurations; and include said operating costs in the determining step.

26. An apparatus as claimed in claim 25 wherein the processor is further configured to vary said quantity of clusters to determine a quantity less than said pre-specified amount for which said overall over-provisioning resource cost is substantially minimized; and use that quantity of clusters for which said overall over-provisioning resource cost is substantially minimized in the assigning step.

27. An apparatus as claimed in claim 15 wherein the processor is further configured to associate an operating cost with each of said given set of provisioned machine configurations; and include said operating costs in the determining step.

28. An apparatus as claimed in claim 27 wherein the processor is further configured to vary said quantity of clusters to determine a quantity less than said pre-specified amount for which said overall over-provisioning resource cost is substantially minimized; and use that quantity of clusters for which said overall over-provisioning resource cost is substantially minimized in the assigning step.

* * * * *